United States Patent
Ishii et al.

(10) Patent No.: US 7,664,458 B2
(45) Date of Patent: Feb. 16, 2010

(54) WIRELESS COMMUNICATION SYSTEM THAT PERFORMS DIVERSITY COMBINING OF RADIO SIGNALS FROM MOBILE TERMINAL RECEIVED THROUGH PLURALITY OF RELAY STATIONS

(75) Inventors: Hidenori Ishii, Tokyo (JP); Kenji Takagi, Cupertino, CA (US)

(73) Assignee: Panasonic Corporation, Osaka (JP)

( * ) Notice: Subject to any disclaimer, the term of this patent is extended or adjusted under 35 U.S.C. 154(b) by 331 days.

(21) Appl. No.: 10/582,793

(22) PCT Filed: Mar. 17, 2005

(86) PCT No.: PCT/JP2005/004798

§ 371 (c)(1),
(2), (4) Date: Jun. 14, 2006

(87) PCT Pub. No.: WO2005/120100

PCT Pub. Date: Dec. 15, 2005

(65) Prior Publication Data

US 2008/0045220 A1    Feb. 21, 2008

(30) Foreign Application Priority Data

Jun. 3, 2004   (JP)   ............................ 2004-166068

(51) Int. Cl.
  *H04B 3/36*   (2006.01)
  *H04B 7/185*  (2006.01)
  *H04B 7/14*   (2006.01)
(52) U.S. Cl. ........................ 455/7; 455/13.1; 370/315
(58) Field of Classification Search ................ 455/436, 455/437, 438, 13.1, 7; 370/315
See application file for complete search history.

(56) References Cited

U.S. PATENT DOCUMENTS

| | | | |
|---|---|---|---|
| 6,519,457 B1 * | 2/2003 | Jiang et al. | 455/442 |
| 6,574,475 B1 | 6/2003 | Suzuki | |
| 7,236,788 B2 * | 6/2007 | Mohebbi | 455/437 |
| 2001/0007819 A1 * | 7/2001 | Kubota | 455/439 |
| 2003/0224826 A1 | 12/2003 | Sakata et al. | |
| 2005/0141593 A1 * | 6/2005 | Pasanen et al. | 375/130 |

FOREIGN PATENT DOCUMENTS

| | | |
|---|---|---|
| JP | 11-266198 | 9/1999 |
| JP | 2000-69532 | 3/2000 |
| JP | 2001-45534 | 2/2001 |
| JP | 2003-348661 | 12/2003 |

\* cited by examiner

*Primary Examiner*—Vincent P Harper
*Assistant Examiner*—Omoniyi A Obayanju
(74) *Attorney, Agent, or Firm*—Wenderoth, Lind & Ponack, L.L.P.

(57) ABSTRACT

A table identifying a correspondence between a cell and a main base station accommodating the cell is prepared in a node (wireless network control apparatus or main base station) within a radio access network. When a terminal is moved and enters an overlapped area of cells (a) and (b) from an original cell (a), where a main base station (to which the terminal was connected in the cell (a) can accommodate the cell (b) that the terminal has entered, the sub base station is connected to the main base station, and site diversity is performed in the main base station. When site diversity is performed between main base stations in a radio access network using a base station in which a baseband processing section is separated from a radio transmission/reception section, traffic flowing between the wireless network control apparatus and the base station is reduced.

12 Claims, 18 Drawing Sheets

| BASE STATION MANAGEMENT TABLE | | |
|---|---|---|
| CELL ID IN PLMN | (a) | (b) |
| CELL ID IN RAN UNDER MANAGEMENT OF FIRST MAIN BASE STATION | 1(default) | 2 |
| CELL ID IN RAN UNDER MANAGEMENT OF SECOND MAIN BASE STATION | NO CONNECTION | 3(default) |
| SCRAMBLING CODE | s1 | s2 |

PRIOR ART

PRIOR ART

| BASE STATION CORRESPONDENCE TABLE | | |
|---|---|---|
| CELL ID IN PLMN | (a) | (b) |
| MAIN BASE STATION | FIRST MAIN BASE STATION | SECOND MAIN BASE STATION |
| CELL ID IN RAN | 1 | 2 |

FIG. 20

WIRELESS COMMUNICATION SYSTEM THAT PERFORMS DIVERSITY COMBINING OF RADIO SIGNALS FROM MOBILE TERMINAL RECEIVED THROUGH PLURALITY OF RELAY STATIONS

BACKGROUND OF THE INVENTION

1. Field of the Invention

The present invention relates to a transmission method in a case where a functionally-distributed base station is used in a radio access network of a mobile communication system, and particularly relates to a handover technique for keeping communication when a terminal is moved.

2. Description of the Related Art

Use of mobile phones is now expanded to not only voice communication, but also a field requiring a broad band such as access to WWW or video phones. To respond to this, so-called the third-generation method represented by the W-CDMA (Wideband Code Division Multiple Access) method or the MC-CDMA (Multicarrier CDMA) method is being introduced.

As one of methods for responding to increased demand, reduction of cells is given, in which a cover area of a base station is narrowed and thus increased number of base stations are disposed. In the reduction of cells, a cell that is an area allowing communication between the base station and a terminal of a mobile phone is narrowed, and the capacity of the base station is decreased to reduce cost, so that increased number of base stations are disposed. This reduction of cells has the following two problems.

As a first problem, since the cell is narrowed, the number of cells, through which a terminal passes during moving a certain distance, is increased, and consequently frequency of handover processing, or frequency of changing a base station as a communication object by a terminal in communication, is increased. This increases signaling load on base stations in the overall radio access network or a wireless network control apparatus that controls the base stations. Particularly in the W-CDMA system, site diversity (diversity handover) is performed, wherein a terminal communicates with a plurality of base stations at the same time in a period while the terminal is situated in a place where cells of the plurality of base stations are overlapped, so that communication quality is improved in a radio zone. Therefore, hardware resources for transmission of all the base stations to be communicated with the terminal are consumed compared with a case that the handover processing in which the base station is simply changed is performed. Since the wireless network control apparatus has a feature of accommodating a plurality of base stations, the number of installed wireless network control apparatus is extremely smaller than the number of base stations. Therefore a line (called Iub in 3GPP) between the wireless network control apparatus and the base station is typically long compared with length of a physical line between a core network of the mobile phone and the wireless network control apparatus. At that time, when bands of network between the wireless network control apparatus and the base stations are consumed by site diversity, a higher-speed line is necessary between the wireless network control apparatus and the base station, and consequently cost is increased by a level corresponding to the larger length of the line.

As a second problem, when the number of small-scale base stations is increased under a multimedia traffic environment where various amounts of bands are used for each of users, fragmentation of used hardware resources for each of base stations occurs, and consequently substantial usability of the base stations is deteriorated. For example, when hardware resources corresponding to 9 channels are used in a base station that can accommodate voice call corresponding to 16 channels, even if packet call requiring hardware resources corresponding to 8 channels is generated, the base station can not accommodate the packet call because of insufficient hardware resources. This is the fragmentation of hardware resources. While reduction in usability due to such fragmentation is small in the case of large-scale base stations only, in the case of the small-scale base stations, such a situation that a service, which consumes many hardware resources, can not be accommodated due to such fragmentation of hardware resources may increase.

JP-A-2001-45534 describes a base station in which load on the line between the wireless network control apparatus and the base stations is reduced. The base station described in this patent publication has a configuration where a transmission section that performs signal processing associated with a transmission channel such as baseband processing in the base station is separated from an antenna section that transmits and receives a radio signal, and converts the signal into a wired signal to be used within the base station. In the configuration, since the antenna section is realized at low cost compared with a small-scale base station, an area to be covered by a cell can be expanded inexpensively. By collecting hardware resources of the transmission section in large quantities, an advantage of efficiently using the hardware resources is given.

FIG. 15 shows a block diagram of a radio access network (RAN) in the case that the functionally-distributed base stations are introduced in the W-CDMA method. The radio access network of the W-CDMA method is described as TS (Technical Specification) 25. 401 "UTRAN Overall Architecture" in 3GPP (3rd Generation Partnership Project). According to the specification, a wireless network control apparatus that controls base stations in the radio access network and the base stations exist in the radio access network of the W-CDMA method.

FIG. 15 shows a system block diagram in the case that the functionally-distributed base stations are used for the W-CDMA system. While an example where two sets of main base stations and sub base stations are disposed is shown for simplification here, the number of the main base stations or the sub base stations is not limited to two sets. The sub base station converts a down spread signal from the main base station into a radio signal. On the other hand, regarding an up radio signal from a terminal, the sub base station outputs the signal as the spread signal without conversion to a main base station connected thereto. While the main base stations and the sub base stations are in one-to-one correspondence respectively in FIG. 15, actually a plurality of sub base stations are disposed for one main base station. This increases capacity of hardware resources of the main base station, consequently loss due to fragmentation of the hardware resources can be reduced.

When the terminal performs the site diversity with a plurality of cells of sub base stations, in the case that the all the sub base stations belong to the same main base station, macro diversity combining (MDC) may be performed, wherein the main base station combines the up radio signals from the terminal. In this case, bands in which the line between the wireless network control apparatus and the main base station is consumed are the same as in the case that MDC is not performed. When the radio access network is configured only by the small-scale base stations without using such functionally-distributed base stations, MDC is performed in the wireless network control apparatus. Therefore, since the radio signals from the terminal to the wireless network control apparatus is transmitted through all the small-scale base stations as objects of the site diversity, the signals are increased by the number corresponding to the number of the base stations as the objects of the site diversity compared with the functionally-distributed base stations.

In FIG. 15, a wireless network control apparatus 1501 has a function of controlling devices in the radio access network. A first main base station 1502a and a second main base station 1502b are controlled by the wireless network control apparatus 1501, and perform signal processing such as base-band processing of a signal from the terminal and transmission of the signal to the wireless network control apparatus 1501. The first main base station 1502a and the second main base station 1502b have cells having different areas respectively. In the following description, the first main base station 1502a and the second main base station 1502b are named generically as a main base station 1502. The main base station 1502 communicates with the wireless network control apparatus 1501 in the same format as in a typical base station (Node B in the 3GPP standard). Sub base stations 1503a, 1503b are connected to the main base stations 1502a, 1502b, and convert analog radio signals into wired signals and then transmit the signals to the main base stations 1502a, 1502b, respectively. In the following description, the sub base station 1503a and the sub base station 1503b are named generically as a sub base station 1503.

A terminal 1504a and a terminal 1504b are shown as terminals that perform radio communication. In the following description, it is assumed that the terminal 1504a is moved and arrives at a position of the terminal 1504b. A cell (a) is a cell of the first sub base station 1503a, and a cell (b) is a cell of the second sub base station 1503b.

FIG. 16, FIG. 17 and FIG. 18 show internal configurations of the wireless network control apparatus 1501, main base station 1502, and sub base station 1503 respectively. In FIG. 16, a base station communication section 1601 communicates with the main base station 1502. The base-station communication section 1601 is defined as the Iub interface in UTRAN in 3GPP. A UTRAN control section 1602 performs management and control of nodes or terminals in the radio access network. A general control section 1603 performs control of the wireless network control apparatus 1501 including communication with a core network or operational management.

In FIG. 17, a wireless-network-control-apparatus communication section 1701 communicates with the wireless network control apparatus 1501. The wireless-network-control-apparatus communication section 1701 is defined as the Iub interface in UTRAN in 3GPP. A baseband processing section 1702 performs baseband modulation of a transmission channel. A radio link control section 1703 performs control of a radio link that is a line from the wireless network control apparatus 1501 to the main base station 1502. A sub-base-station communication section 1704 communicates with the sub base station 1503.

In FIG. 18, a main-base-station communication section 1801 communicates with the main base station 1502. A transmission/reception control section 1802 performs start/stop of transmission or change of transmission destination based on instructions of the main base station 1502. A radio communication section 1803 communicates with the terminals 1504a, 1504b using radio signals.

FIG. 19 and FIG. 20 show a data configuration used in the UTRAN control section 1602 of the wireless network control apparatus 1501. As seen in FIG. 19, a cell that is communicates with the terminal 1504a is shown as Active Set. In this example, the wireless network control apparatus 1501 stores a cell ID (a) in PLMN (an abbreviation of Public Land Mobile Network) indicating a cell (a) as Active Set.

FIG. 20 shows a base-station correspondence table 2001. The base-station correspondence table 2001 stores cell IDs in PLMN, names of main base stations, and cell-IDs in RAN of all the cells as control objects in the main base stations for each of the cells. In FIG. 20, since it is assumed that the terminal does not perform the site diversity, the number of elements of the cell-IDs in RAN is one each. In an example in the related art, all the cell-IDs in PLMN uniquely correspond to the main base stations.

BRIEF DISCLOSURE OF THE INVENTION

In the case that a technique described above is used, when the terminal 1504a arrives at the position of the terminal 1504b in FIG. 15, and the terminal starts the site diversity over a plurality of main base stations 1502a, 1502b, two lines are necessarily connected between the wireless network control apparatus 1501, and the first main base station 1502a and the second main base station 1502b.

This is shown in detail using FIG. 21 below. In the W-CDMA system, the processing is defined in RRC (Radio Resource Control, a protocol between the terminal and the wireless network control apparatus, defined in 3GPP TS25.331) and NBAP (Node B Application Part, a protocol between the base station and the wireless network control apparatus, defined in 3GPP TS25.433) in 3GPP.

In all the nodes in the radio access network of FIG. 15 (the wireless network control apparatus 1501, main base station 1502, and sub base station 1503), it is assumed that common channels used for signaling data transmission have been set. The terminal 1504a is assumed to communicate with the wireless network control apparatus 1501 via the sub base station 1503a and the main base station 1502a as a signal 2101. In the case of the W-CDMA, a dedicated channel (DCH) is used for communication. The dedicated channel is a communication channel set for each of the terminals.

Next, a fact that the terminal 1504a has been moved to the position of the terminal 1504b is detected in an event 2102. When the terminal 1504b detects a pilot signal of CPICH (Common Pilot Channel), which is outputted by the second main base station 1502b via the second sub base station 1503b, the terminal 1504b outputs a power measurement report 2103 to the wireless network control apparatus 1501. Based on the power measurement report 2103, the wireless network control apparatus 1501 detects that it can be communicatively connected to the terminal 1504b in the cell (b) and decides to communicate with the terminal 1504b. Then, the wireless network control apparatus 1501 sets the dedicated channel according to a radio link addition request 2104 and a radio link addition response 2106. Since the functionally-distributed base stations are used in this case, a signal 2105 for starting transmission/reception is exchanged between the second main base station 1502b and the second sub base station 1503b during setting the dedicated channel. In the W-CDMA system, Radio Link Addition Procedure in RRC is used for this procedure. According to the procedure, the dedicated channel is set as a signal 2107.

Next, the wireless network control apparatus 1501 performs processing of adding a communication channel (branch) for site diversity. Specifically, it outputs a branch addition request 2108 to the terminal 1501b via the dedicated channel. The terminal 1501b opens a communication channel via the second main base station 1502b and the second sub base station 1503b, and then notifies the wireless network control apparatus 1501 of the success of opening the communication channel by branch addition response 2109. In the W-CDMA system, Active Set Update Procedure in RRC is used for this procedure. As a result, a transmission channel is opened as a signal 2110.

The wireless network control apparatus 1501 performs the site diversity using two dedicated channels of (1) wireless network control apparatus 1501-first main base station 1502a-first sub base station 1503a-terminal 1504b, and (2) wireless network control apparatus 1501-second main base station 1502b-second sub base station 1503b-terminal 1504b.

In this way, since two dedicated channels are used between the wireless network control apparatus 1501 and the two main base stations 1502a, 1502b, a larger amount of bands is consumed.

An object of the invention is to reduce the total traffic between the wireless network control apparatus and the main base station devices, and furthermore load on the wireless network control apparatus is reduced even if the terminal is moved over main base stations.

A wireless network control system of the present invention comprises: a plurality of base stations that communicate with a mobile terminal; and relay stations provided in association with the respective base stations to relay communication between the mobile terminal and the base station, wherein when more than one of the plurality of base stations detect the mobile terminal within each accommodation areas, one of the base stations which detected the mobile station establishes communication connection to the relay station associated with another base station which detected the mobile station, and then performs diversity combining of radio signals from the mobile terminal received through the relay station associated with the one of the base stations and the relay station associated with the another base station.

The wireless network control system of the present invention may comprises, a wireless network control apparatus that controls communication between the base stations and the mobile terminal, wherein the wireless network control apparatus comprises, a management table that stores information on relay station which can be communicatively connected to the base station, in relation to the respective base stations; search means that, when more than one of the plurality of the base stations detect the mobile terminal, searches a base station which can be communicatively connected to relay stations associated with the base stations which detected the mobile terminal, from the base stations which detected the mobile terminal, based on the management table; and control means that allows communication connection to be established between the base station searched by the search means and the respective relay stations; wherein the base station comprises combining means that performs diversity combining of radio signals from the mobile terminal received through the respective relay stations.

When a mobile terminal is detected based on information indicating radio field intensity received from the mobile terminal, the search means may search a base station that can be communicatively connected to relay stations that have relayed the information indicating the radio field intensity.

The control means of the wireless network control apparatus may disconnect communicative connection between base station other than the base station searched by the search means and the relay station.

In the wireless network control system of the present invention, the base station may comprise relay-station-information transmission means that transmits information indicating relay stations to which the base station can be communicatively connected to the wireless network control apparatus; and the wireless network control apparatus comprises management-table update means that updates the management table based on the information indicating the communicatively connectable relay stations transmitted from the base station.

In the wireless network control system of the present invention, the base station may comprise: inter-base station communication means for communicating with the another base station; a management table that stores information on relay station which can be communicatively connected to the base station; determination means that, when the mobile terminal is detected, determines whether the another base station in communication with the same mobile terminal exist or not based on information from the another base station obtained by communication using the inter-base station communication means; search means that, when the another base station in communication with the same mobile terminal detected by the base station is determined to exist, searches a base station which can be communicatively connected to a relay station associated with the base station and relay station associated with the another base station which communicate with the same mobile terminal based on the management table; control means that communicates a control signal through the inter-base station communication means such that communication connection is established between the base station searched by the search means and the respective relay stations; and combining means that performs diversity combining of radio signals from the mobile terminal received through a plurality of relay stations.

In the wireless network control system of the present invention, when a mobile terminal is detected based on the information indicating the radio field intensity received from the mobile terminal, the determination means may determine whether the another base station that receive the information indicating the radio field intensity of the same mobile terminal exist or not, and the search means searches a base station that can be communicatively connected to relay station that have relayed the information indicating the radio field intensity.

In the wireless network control system of the present invention, the control means of the base station may communicate the control signal through the inter-base station communication means such that the communication connection between a base station other than the base station searched by the search means and the respective relay stations is disconnected.

In the wireless network control system of the present invention, the base station transmits information on communication connection with a mobile terminal within an accommodation cell to the another base station through the inter-base station communication means.

A wireless network control apparatus of the present invention that controls a radio access network having a plurality of base stations which communicate with a mobile terminal, and relay stations provided in association with the respective base stations to relay communication between the mobile terminal and the base stations may comprises, a management table that stores information on relay stations which can be communicatively connected to the base station, in relation to the respective base stations; search means that, when more than one of the plurality of base stations detect a mobile terminal, searches a base station that can be communicatively connected to the relay stations associated with the base stations that detected the mobile terminal from the plurality of base stations based on the management table; and control means that, in order to allow the base station searched by the search means to perform diversity combining of radio signals from the mobile terminal, the signals being relayed by the relay stations associated with the base stations which detected the mobile terminal respectively, establishes communication connection between the base station and the respective relay stations, and allows the radio signals to be transmitted from the respective relay stations to the base station.

A base station of the present invention that can communicate with a mobile terminal through a relay station may comprises: inter-base station communication means for communicating with another base station; a management table that stores information on a relay station associated with the base station, and relay station which is associated with the another base station and can be communicatively connected to the base station; determination means that, when a mobile terminal is detected, determines whether the another base station in communication with the same mobile terminal exist or not based on information from the another base station obtained by communication using the inter-base station communication means; search means that, when the another base station in communication with the same mobile terminal detected by the base station is determined to exist, searches a base station that can be communicatively connected to the relay station associated with the base station and the relay station associated with the another base station based on the management table; control means that communicates a control signal through the inter-base station communication means such that communication connection is established between the base station searched by the search means and the respective relay stations; and combining means that performs diversity combining of radio signals from the mobile terminal received through the respective relay stations.

A wireless network control method of the present invention that controls a radio access network having a plurality of base stations which communicate with a mobile terminal, and relay stations provided in association with the respective base stations to relay communication between the mobile terminal and the base station may comprise: a mobile-terminal detection step where the base stations detect the mobile terminal; a step where, when more than one of the plurality of base stations detect a mobile terminal within each accommodation area, one of the base stations which detected the mobile station establishes communication connection to the relay station associated with another base station which detected the mobile terminal; and a combining step where the one of the base stations performs diversity combining of radio signals from the mobile terminal, the signals being received through relay station associated with the one of the base stations and the relay station associated with the another base station.

A wireless network control method of the present invention that controls a radio access network having a plurality of base stations which communicate with a mobile terminal, and relay stations provided in association with the respective base stations to relay communication between the mobile terminal and the base station may comprises, a mobile-terminal detection step where a wireless network control apparatus detects the mobile terminal, a search step where, when more than one of the plurality of base stations detect the mobile terminal in the mobile-terminal detection step, one of the base stations which detected the mobile terminal is searched from the base stations which detected the mobile station based on a management table, wherein searched based station can be communicatively connected to relay station associated with the base stations which detected the mobile station, wherein the management table stores information on relay stations which can be communicatively connected to the respective base stations in relation to the respective base stations, and a control step where, in order to allow the one of the base stations searched by the search means to perform diversity combining of radio signals from the mobile terminal, the signals being relayed through the relay stations associated with the base stations which detected the mobile station respectively, and to perform communication connection between the one of the base stations and the respective relay stations is established, and the radio signals are allowed to be transmitted from the respective relay stations to the one of the base stations.

A wireless network control method of the present invention that controls a radio access network having a plurality of base stations that communicate with a mobile terminal, and relay stations provided in association with the respective base stations to relay communication between the mobile terminal and the base station may comprise: a mobile-terminal detection step where the base station detects a mobile terminal; a determination step where, when the base station detects the mobile terminal, whether another base station in communication to the same mobile terminal exist or not is determined based on information obtained from the another base stations; a search step where, when the another base station in communication with the mobile terminal detected by the base station are determined to exist, a base station that can be communicatively connected to a relay station associated with the base station and relay station associated with the another base station is searched based on a management table, wherein the management table stores information on the relay station associated with the base station and the relay station which is associated with the another base station and can be communicatively connected to the base station; a control step where a control signal is communicated through inter-base station communication means such that communication connection is established between the base station searched by the search step and the respective relay stations; and a combining step that performs diversity combining of radio signals from the mobile terminal received through a plurality of relay stations.

As described hereinafter, there are other aspects in the invention. Therefore, disclosure of the invention is intended to provide aspects of part of the invention, and is not intended to limit the claimed scope of the invention.

BRIEF DESCRIPTION OF THE DRAWINGS

FIG. 20 is a data field diagram of a base-station corresponding table in the related art.

DETAILED DESCRIPTION OF THE INVENTION

Figure 1:
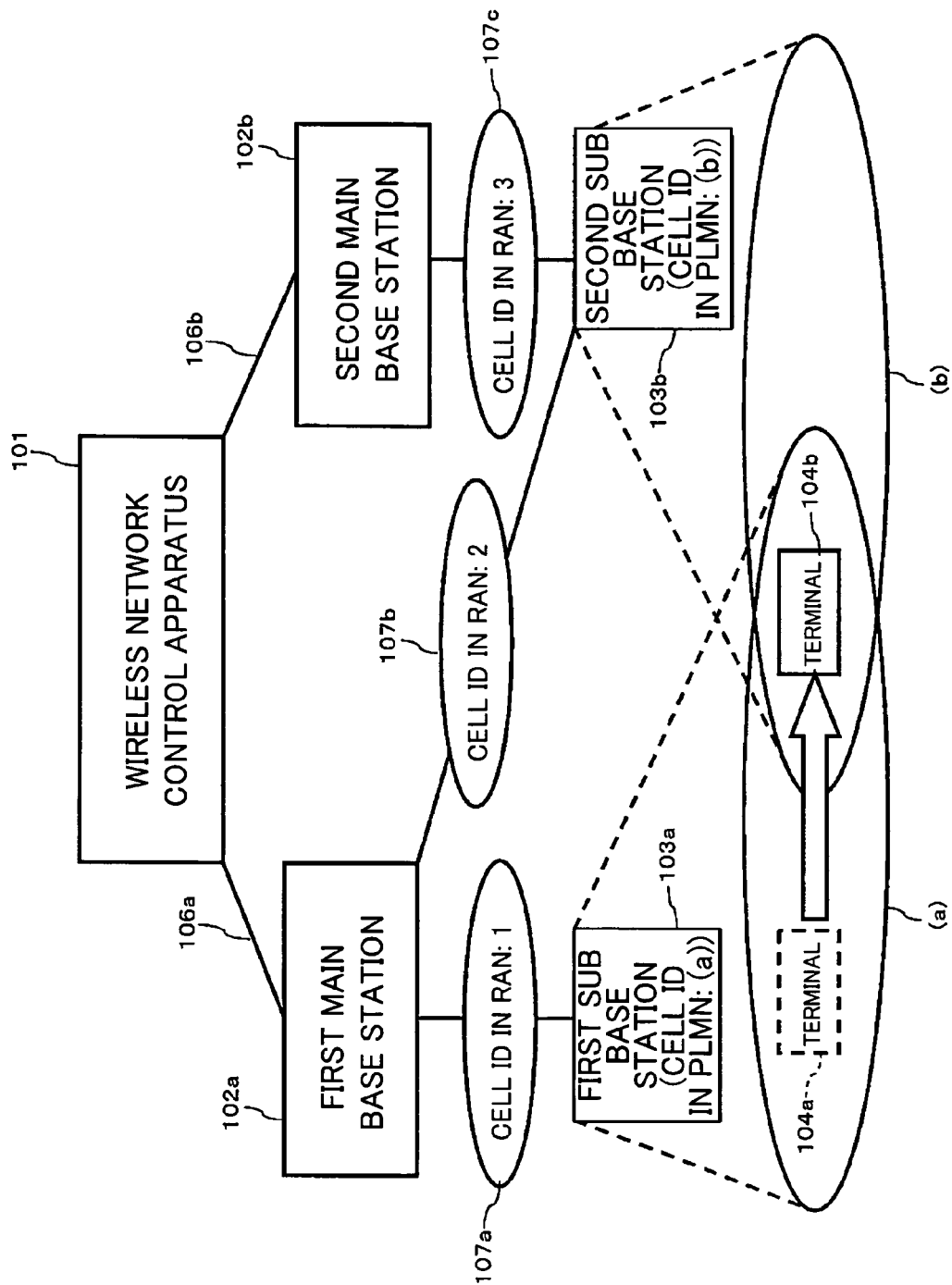
FIG. 1 is a general block diagram of a radio access network in a first embodiment.

Hereinafter, detailed description of the invention is described. However, the following detailed description and attached drawings are not intended to limit the invention. The scope of the invention is provided by attached claims.

A wireless network control system of the embodiment comprises: a plurality of base stations that communicate with a mobile terminal; and relay stations provided in association with the respective base stations to relay communication between the mobile terminal and the base station, wherein when more than one of the plurality of base stations detect the mobile terminal within each accommodation areas, one of the base stations which detected the mobile station establishes communication connection to the relay station associated with another base station which detected the mobile station, and then performs diversity combining of radio signals from the mobile terminal received through the relay station associated with the one of the base stations and the relay station associated with the another base station.

In the radio access network in which the relay stations are provided in association with the base stations in this way, when a plurality of base stations detect one mobile terminal, one of the plurality of base stations establishes communication connection to respective relay stations in communication with the relevant one mobile terminal, and consequently radio signals from the mobile terminal are transmitted to the one base station. The one base station performs diversity combining of the radio signals received from the plurality of relay stations, and transmits a combined radio signal to a wireless network control apparatus. Thus, the traffic between the base stations and the wireless network control apparatus can be reduced, and load on the wireless network control apparatus can be reduced.

The wireless network control system of the embodiment may comprises: a wireless network control apparatus that controls communication between the base stations and the mobile terminal, wherein the wireless network control apparatus comprises, a management table that stores information on relay station which can be communicatively connected to the base station, in relation to the respective base stations; search means that, when more than one of the plurality of the base stations detect the mobile terminal, searches a base station which can be communicatively connected to relay stations associated with the base stations which detected the mobile terminal, from the base stations which detected the mobile terminal, based on the management table; and control means that allows communication connection to be established between the base station searched by the search means and the respective relay stations; wherein the base station comprises combining means that performs diversity combining of radio signals from the mobile terminal received through the respective relay stations.

In this way, the wireless network control apparatus knows relay stations that can relay with respective base stations by the management table, thereby when a plurality of base stations detect one mobile terminal, the device can search a base station that can be communicatively connected to respective relay stations in communication with the relevant one mobile terminal. Then, for example, the wireless network control apparatus transmits a channel connection request to a searched base station, thereby establishes communication connection between the searched base station and respective relay stations, and consequently allows the one base station to perform diversity combining of the radio signals received from the plurality of relay stations.

When a mobile terminal is detected based on information indicating radio field intensity received from the mobile terminal, the search means may search a base station that can be communicatively connected to relay stations that have relayed the information indicating the radio field intensity.

In this way, when one mobile terminal is detected based on the information indicating the radio field intensity of the mobile terminal, and a plurality of base stations detect the one mobile terminal, the base station that can be communicatively connected to respective relay stations that have relayed the information indicating the radio field intensity is searched, thereby diversity combining can be performed in the searched base station.

The control means of the wireless network control apparatus may disconnect communicative connection between base station other than the base station searched by the search means and the relay station.

In this way, the communicative connection between the base stations other than the searched base station and respective relay stations is deleted, thereby resources of the base stations other than the searched base station can be released and thus effectively used.

In the wireless network control system of the embodiment, the base station may comprise relay-station-information transmission means that transmits information indicating relay stations to which the base station can be communicatively connected to the wireless network control apparatus; and the wireless network control apparatus comprises management-table update means that updates the management table based on the information indicating the communicatively connectable relay stations transmitted from the base station.

In this way, the information indicating the relay stations to which the base stations can be communicatively connected is transmitted from the base stations to the wireless network control apparatus, so that the management table of the wireless network control apparatus is updated, thereby even if a relation between the base stations and the relay stations is changed, the wireless network control apparatus can perform appropriate control for reducing traffic between the device and the base stations based on an updated management table.

In the wireless network control system of the embodiment, the base station may comprise, inter-base station communication means for communicating with the another base station; a management table that stores information on relay station which can be communicatively connected to the base station; determination means that, when the mobile terminal is detected, determines whether the another base station in communication with the same mobile terminal exist or not based on information from the another base station obtained by communication using the inter-base station communication means; search means that, when the another base station in communication with the same mobile terminal detected by the base station is determined to exist, searches a base station which can be communicatively connected to a relay station associated with the base station and relay station associated with the another base station which communicate with the same mobile terminal based on the management table; control means that communicates a control signal through the inter-base station communication means such that communication connection is established between the base station searched by the search means and the respective relay stations; and combining means that performs diversity combining of radio signals from the mobile terminal received through a plurality of relay stations.

In this way, information is received from another base station using the inter-base-station communication means, thereby whether the mobile terminal situated in an accommodation cell of the base station is included in accommodation cells of another base stations or not can be known. Since the base station knows relay stations to which the base station can be communicatively connected by the management table, the base station can search one base station that can receive radio signals from the mobile terminal included in both of the accommodation cells of the base station and another base station. Thus, the base station establishes communication connection between the one base station and respective relay stations, and allows the searched base station to perform diversity combining of the radio signals received from a plurality of relay stations. According to this configuration, since the base station performs control after knowing the communicatively connectable relay stations, an existing wireless network control apparatus can be used as it is.

In the wireless network control system of the embodiment, when a mobile terminal is detected based on the information indicating the radio field intensity received from the mobile terminal, the determination means may determine whether the another base station that receive the information indicating the radio field intensity of the same mobile terminal exist or not, and the search means searches a base station that can be communicatively connected to relay station that have relayed the information indicating the radio field intensity.

In this way, one mobile terminal is detected based on the information indicating the radio field intensity of the mobile terminal, and when the one mobile terminal is detected in another base station, the base stations that can be communicatively connected to respective relay stations which relay the information indicating the radio field intensity is searched, thereby the diversity combining can be performed in the searched base station.

In the wireless network control system of the embodiment, the control means of the base station may communicate the control signal through the inter-base station communication means such that the communication connection between a base station other than the base station searched by the search means and the respective relay stations is disconnected.

In this way, the communication connection between the base stations other than the searched base station and respective relay stations is disconnected, thereby resources of the base stations other than the searched base station can be released and thus effectively used.

In the wireless network control system of the embodiment, the base station transmits information on communication connection with a mobile terminal within an accommodation cell to the another base station through the inter-base station communication means.

In this way, the information on the communication connection with the mobile terminal is transmitted to another base station, thereby another base station can determine whether they are to perform the handover processing or not.

A wireless network control apparatus of the embodiment that controls a radio access network having a plurality of base stations which communicate with a mobile terminal, and relay stations provided in association with the respective base stations to relay communication between the mobile terminal and the base stations may comprise: a management table that stores information on relay stations which can be communicatively connected to the base station, in relation to the respective base stations; search means that, when more than one of the plurality of base stations detect a mobile terminal, searches a base station that can be communicatively connected to the relay stations associated with the base stations that detected the mobile terminal from the plurality of base stations based on the management table; and control means that, in order to allow the base station searched by the search means to perform diversity combining of radio signals from the mobile terminal, the signals being relayed by the relay stations associated with the base stations which detected the mobile terminal respectively, establishes communication connection between the base station and the respective relay stations, and allows the radio signals to be transmitted from the respective relay stations to the base station.

Thus, the traffic between the base stations and the wireless network control apparatus can be reduced, and load on the wireless network control apparatus can be reduced as in the wireless network control system.

A base station of the embodiment that can communicate with a mobile terminal through a relay station may comprise: inter-base station communication means for communicating with another base station; a management table that stores information on a relay station associated with the base station, and relay station which is associated with the another base station and can be communicatively connected to the base station; determination means that, when a mobile terminal is detected, determines whether the another base station in communication with the same mobile terminal exist or not based on information from the another base station obtained by communication using the inter-base station communication means; search means that, when the another base station in communication with the same mobile terminal detected by the base station is determined to exist, searches a base station that can be communicatively connected to the relay station associated with the base station and the relay station associated with the another base station based on the management table; control means that communicates a control signal through the inter-base station communication means such that communication connection is established between the base station searched by the search means and the respective relay stations; and combining means that performs diversity combining of radio signals from the mobile terminal received through the respective relay stations.

Thus, the traffic between the base stations and the wireless network control apparatus can be reduced, and load on the wireless network control apparatus can be reduced as in the wireless network control system.

A wireless network control method of the embodiment that controls a radio access network having a plurality of base stations which communicate with a mobile terminal, and relay stations provided in association with the respective base stations to relay communication between the mobile terminal and the base station may comprise: a mobile-terminal detection step where the base stations detect the mobile terminal; a step where, when more than one of the plurality of base stations detect a mobile terminal within each accommodation area, one of the base stations which detected the mobile station establishes communication connection to the relay station associated with another base station which detected the mobile terminal; and a combining step where the one of the base stations performs diversity combining of radio signals from the mobile terminal, the signals being received through relay station associated with the one of the base stations and the relay station associated with the another base station.

Thus, the traffic between the base stations and the wireless network control apparatus can be reduced, and load on the wireless network control apparatus can be reduced as in the wireless network control system.

A wireless network control method of the embodiment that controls a radio access network having a plurality of base stations which communicate with a mobile terminal, and relay stations provided in association with the respective base stations to relay communication between the mobile terminal and the base station may comprises, a mobile-terminal detection step where a wireless network control apparatus detects the mobile terminal, a search step where, when more than one of the plurality of base stations detect the mobile terminal in the mobile-terminal detection step, one of the base stations which detected the mobile terminal is searched from the base stations which detected the mobile station based on a management table, wherein searched based station can be communicatively connected to relay station associated with the base stations which detected the mobile station, wherein the management table stores information on relay stations which can be communicatively connected to the respective base stations in relation to the respective base stations; and a control step where, in order to allow the one of the base stations searched by the search means to perform diversity combining of radio signals from the mobile terminal, the signals being relayed through the relay stations associated with the base stations which detected the mobile station respectively, and to perform communication connection between the one of the base stations and the respective relay stations is established, and the radio signals are allowed to be transmitted from the respective relay stations to the one of the base stations.

Thus, the traffic between the base stations and the wireless network control apparatus can be reduced, and load on the wireless network control apparatus can be reduced as in the wireless network control system.

A wireless network control method of the embodiment that controls a radio access network having a plurality of base stations that communicate with a mobile terminal, and relay stations provided in association with the respective base stations to relay communication between the mobile terminal and the base station may comprises, a mobile-terminal detection step where the base station detects a mobile terminal; a determination step where, when the base station detects the mobile terminal, whether another base station in communication to the same mobile terminal exist or not is determined based on information obtained from the another base stations; a search step where, when the another base station in communication with the mobile terminal detected by the base station are determined to exist, a base station that can be communicatively connected to a relay station associated with the base station and relay station associated with the another base station is searched based on a management table, wherein the management table stores information on the relay station associated with the base station and the relay station which is associated with the another base station and can be communicatively connected to the base station; a control step where a control signal is communicated through inter-base station communication means such that communication connection is established between the base station searched by the search step and the respective relay stations; and a combining step that performs diversity combining of radio signals from the mobile terminal received through a plurality of relay stations.

Thus, the traffic between the base stations and the wireless network control apparatus can be reduced, and load on the wireless network control apparatus can be reduced as in the wireless network control system.

Hereinafter, a radio control system of an embodiment of the invention is described using drawings. While the W-CDMA system is supposed to be used in the following description, the embodiment of the invention can be applied to the GSM or MC-CDMA method having a radio access network in which a wireless network control apparatus controls nodes under the device or terminals.

First Embodiment

First, an entire configuration is described using FIG. 1 that is a block diagram of a radio access network of a first embodiment. The radio access network includes a wireless network control apparatus 101, first main base station 102a, second main base station 102b, first sub base station 103a, second sub base station 103b, and a terminal 104. In the following description, the first main base station 102a and the second main base station 102b are generically named as a base station 102, and the first sub base station 103a and the second sub base station 103b are generically named as a sub base station 103. The main base station 102 is a configuration corresponding to "base station" in claims. To indicate a position of a mobile terminal 104, when the mobile terminal is situated in a cell (a), it is called mobile terminal 104a, and when it is situated in an area where the cell (a) is overlapped with a cell (b), it is called mobile terminal 104b.

The sub base station 103 acts as a relay station that relays communication between the main base station 102 and a terminal 104, and is a configuration corresponding to a "relay station," as claimed. The wireless network control apparatus 101 controls the main base station 102 and the terminal 104 in the radio access network. The wireless network control apparatus 101 knows a relation between the main base station 102 and the sub base station 103. When up common-channel signals from the sub base station 103 which are shared by a plurality of main base stations 102 arrives at the wireless network control apparatus 101 via a plurality of routes, the wireless network control apparatus 101 selects one of the signals.

The first main base station 102a and the second main base station 102b perform, based on control by the wireless network control 101, setting of a communication channel, transmission processing of a channel, baseband processing, and MDC during site diversity within the main base station. The first sub base station 103a is associated with the first main base station 102a. That is, the first sub base station 103a relays a pilot signal from the first main base station 102a and transmits the signal to the terminal 104 in the cell (a); and transmits information, indicating received radio field intensity of a pilot signal transmitted from the terminal 104, to the first main base station 102a. Similarly, the second sub base station 103b is associated with the second main base station 102b. The second sub base station 103b is connected to the first base station 102a in addition to the second base station 102*b*. The second sub base station 103*b* additively synthesizes down spread signals from both of the first main base station 102*a* and the second main base station 102*b*, and converts a synthesized signal into a radio signal. On the other hand, regarding an up radio signal from the terminal, the second sub base station 103*b* outputs the signal to both of the first main base station 102*a* and the second main base station 102*b* as a spread signal without conversion. The sub base station is different from a sub base station in the related art in that the second sub base station 103*b* is added with such a signal synthesis/separation function of a signal.

Even in the case that baseband processing is performed between the main base station and the sub base station, and only the channel that is handled by each of the base stations is transmitted for a structural reason, the invention is applicable.

The terminal 104*a* and the terminal 104*b* perform radio communication via the radio access network. The terminal 104*a* can communicate only with the first sub base station 103*a*. On the other hand, the terminal 104*b* can communicate with both the first sub base station 103*a* and the second sub base station 103*b*, and first main base station 102*a* performs the site diversity with the two in the embodiment.

The cell (a) is a cell under the first sub base station 103*a*, and the cell (b) is a cell under the second sub base station 103*b*. The wireless network control apparatus 101, respective main base stations 102*a*, 102*b*, and respective sub base stations 103*a*, 103*b* are connected by communication channels 106*a*, 106*b*, 107*a*, 107*b*, and 107*c*. In the embodiment, the main base station 102 and the sub base station 103 are in a many-to-many relationship. While a cell ID in RAN corresponds to the sub base station in the related art, in the embodiment, the cell ID in RAN corresponds to a communication channel between the main base station 102 and the sub base station 103.

In the first embodiment, when the terminal 104*b* performs the site diversity using both the first sub base station 103*a* and the second sub base station 103*b*, only signals corresponding to one channel are transmitted between the wireless network control apparatus 101 and the main base station 102.

For this purpose, the wireless network control apparatus 101 appropriately manages both identifiers of the main base station 102 as a transmission control unit in a radio network and the sub base station 103 corresponding to a physical cell. When the terminal 104*b* outputs a branch addition request to the wireless network control apparatus 101, the wireless network control apparatus 101 determines connection in the radio access network, and when the first sub base station 103*a* and the second sub base station 103*b* are connected to the first main base station 102*a*, an up signal from the second sub base station 103*b* is transmitted via the first main base station 102*a*.

Figure 2:
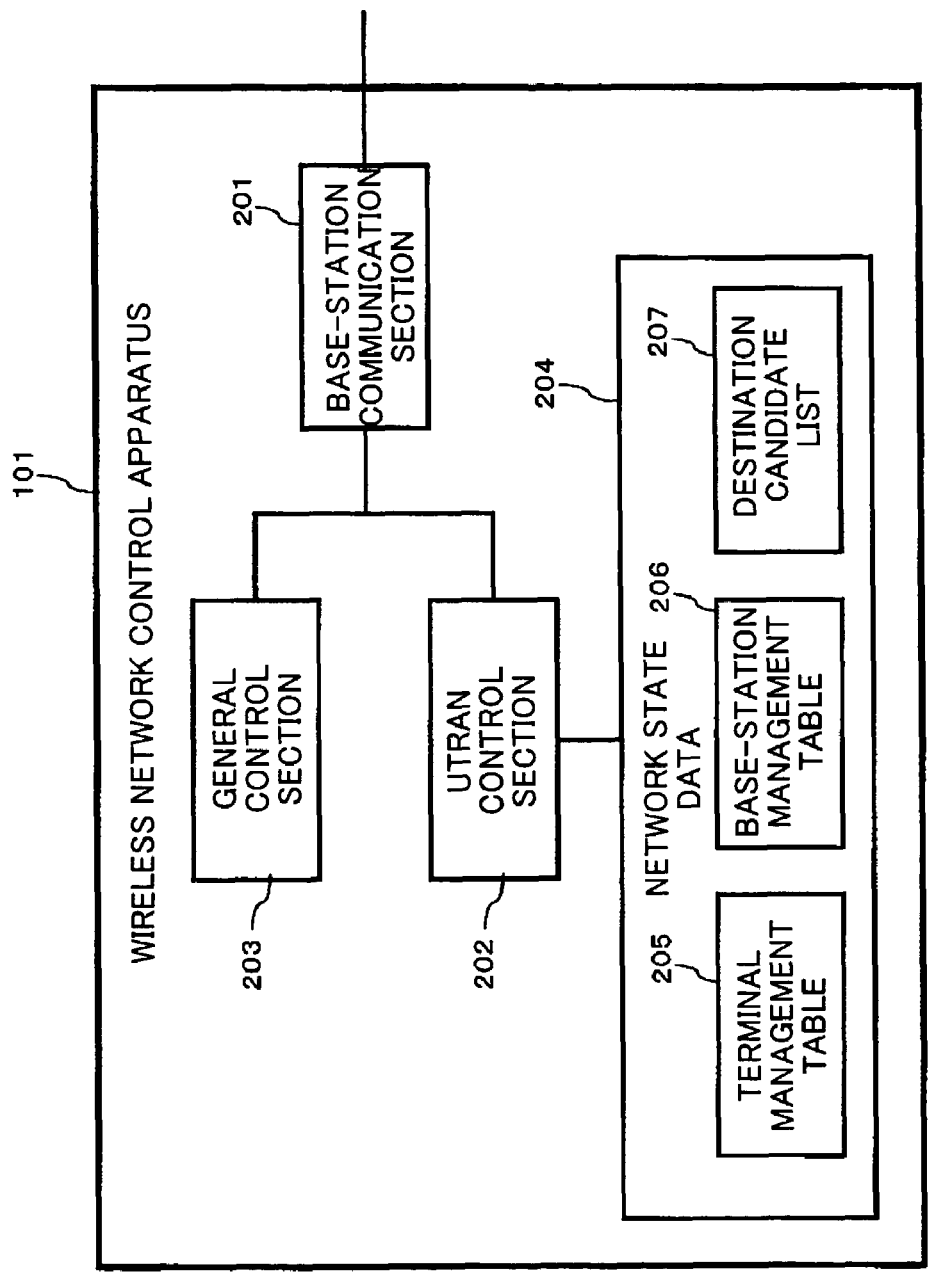
FIG. 2 is a block diagram of a wireless network control apparatus in the first embodiment.

Next, an internal configuration of the wireless network control apparatus 101 of the embodiment is described using FIG. 2. FIG. 2 is a block diagram of an inside of the wireless network control apparatus 101.

In FIG. 2, a base-station communication section 201 is an interface that performs Iub communication in 3GPP with the base station. A UTRAN control section 202 has a function of performing control of a radio access network (UTRAN; Universal Terrestrial Radio Access Network). In the embodiment, determination or control processing of the wireless network control apparatus 101, which is omitted to be described, is performed by the UTRAN control section 202. Positioning of the base station communication section 201, the UTRAN control section 202, or a general control section 203 is the same as that of the base-station communication section 1601, UTRAN control section 1602, or a general control section 1603 in the related art respectively.

The general control section 203 has a function of performing control on the wireless network control apparatus 101 except for the above. For example, the general control section 203 performs communication control with a core network, and search of a base station as a destination of communication connection. The general control section 203 is a configuration corresponding to "search means" or "control means" in claims. Network state data 204 includes a terminal management table 205 and a base-station management table 206, and stores information on a state of the radio access network. The terminal management table 205 is a table for managing a terminal as a control object. The base-station management table 206 is a table for managing a relationship between the main base station 102 and a cell accommodated in respective sub base stations 103. The base-station management table 206 is a configuration corresponding to "management table" in claims.

Figures 3, 4:
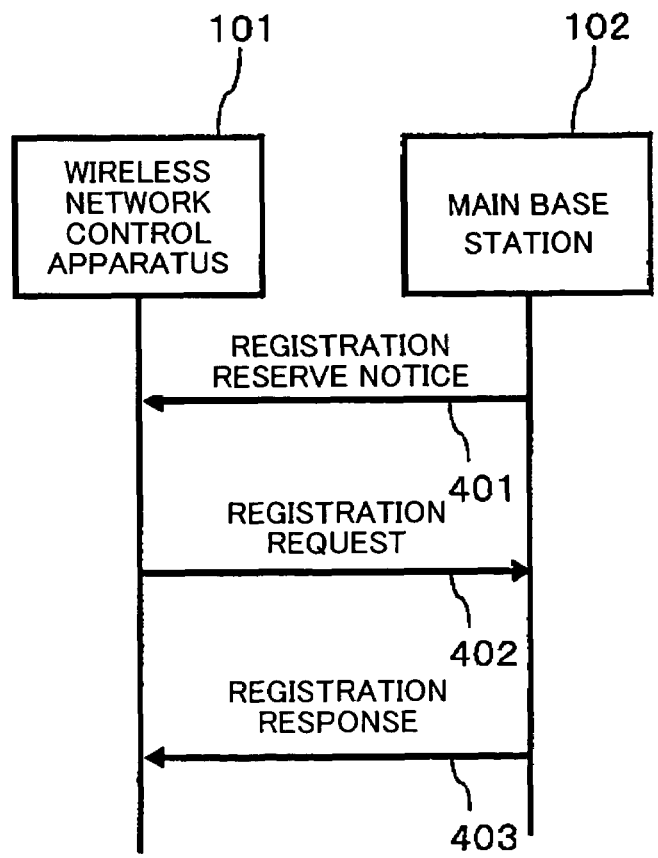
FIG. 3 is a data field diagram of a base-station management table in the first embodiment.
FIG. 4 is a sequence diagram of processing in the first embodiment.

FIG. 3 is a diagram showing an example of data stored in the base-station management table 206. The base-station management table 206 is created by relating a cell ID in PLMN to a cell ID in RAN. As shown in FIG. 3, a cell having a cell ID of (a) in PLMN corresponds to a cell ID: 1 in the first main base station 102*a*. A cell having a cell ID of (b) in PLMN corresponds to a cell ID: 2 in the first main base station 102*a*, and furthermore corresponds to a cell ID: 3 in the second main base station 102*b*. Moreover, the base-station management table 206 stores information of a scrambling code of each cell.

Here, the cell ID in PLMN is an identifier indicating a cell, which is uniquely allocated to all the cells that belong to the same core network. The cell ID in PLMN corresponds on one-to-one to Cell Identify used in RRC. The cell ID in PLMN corresponds to the scrambling code for discriminating a sub base station on a radio zone on a ratio of 1:1. Similarly, the cell ID in RAN is an identifier indicating a cell, which corresponds to the sub base station 103. The cell ID in RAN is uniquely allocated in UTRAN. The cell ID in RAN corresponds to C-ID (Cell ID) and Local Cell ID used in NBAP. The scrambling code is part of symbols used in code modulation of CDMA, and allocated for each of base stations. The scrambling code corresponds to the sub base station or the cell ID in PLMN on a ratio of 1:1.

Hereinafter, operation of a radio control system of the embodiment of the invention is described. Hereinafter, specific procedure in the W-CDMA system is divided into three and then described: (1) initial setting processing of the radio network, (2) processing in branch addition during travel of the terminal from the cell (a) to the cell (b), and (3) processing in branch addition during travel of the terminal from the cell (b) to the cell (a).

In the W-CDMA system, RRC is used as a communication protocol between the wireless network control apparatus 101 and the terminal, and NBAP is used as a communication protocol between the wireless network control apparatus 101 and the main base station. A method of discriminating the cell ID is different between the two communication protocols.

While the wireless network control apparatus 101 has information on a cell ID in PLMN, cell ID in UTRAN, and channelization used in RRC, the main base station 102 can not know the cell ID in PLMN because it does not essentially interpret the RRC protocol. Therefore, the main base station does not have information on which scrambling code is shared by other main base stations. Hereinafter, the embodiment is described on assumption of these points.

FIG. 4 is a diagram showing default operation of the wireless network control apparatus 101. Three identifiers of the cell ID in RAN, the cell ID in PLMN, and a main base station ID of an identifier indicating the main base station are given as description objects in the embodiment. The main base station 102 knows the cell ID in RAN and cell ID in PLMN of sub base station 103 previously connected, and a main-base-station ID of the main base station 102 itself.

When setting of the main base station 102 is changed, the main base station 102 outputs a registration reserve notice 401 to the wireless network control apparatus 101. The registration reserve notice 401 is mounted as AUDIT REQUIRED INDICATION in NBAP. The wireless network control apparatus 101 outputs a registration request 402 with respect to the registration reserve notice 401 to the main base station 102 as a sender of the registration reserve notice 401. This processing is executed by the base-station communication section 201 and the UTRAN control section 202 within the wireless network control apparatus 101.

Even if the registration reserve notice 401 is not given from the main base station 102, the registration request 402 can be outputted from the wireless network control apparatus 101 to start registration sequence. A registration response 403 corresponds to AUDIT REQUIRED in NBAP.

The main base station 102 transmits a main-base station ID of the main base station 102 itself, and cell IDs in RAN and cell IDs in PLMN of all the connected sub base stations 103 to the wireless network control apparatus 101 as the registration response 403 with respect to the registration request 402. Here, the general control section 203 of the main base station 102 reads information of the base-station management table 206 and transmits it to the wireless network control apparatus 101. That is, the general control section 203 has a function as "relay-station information transmission means" in claims. The registration response 403 corresponds to AUDIT RESPONSE in NBAP. For example, in the case of the first main base station 102a, since there are two cells under it, it transmits two combinations of IDs of (1) main base station ID: 1, cell ID in PLMN: (a), and cell ID in RAN: 1 (default), and (2) main-base-station ID: 1, cell ID in PLMN: (b), and cell ID in RAN: 2. Here, when the sub base station 103 is connected to a plurality of main base stations 102, a flag indicating a main-base-station ID of a main base station which is first connected with a terminal that newly starts communication with a W-CDMA network (hereinafter, mentioned as default main-base-station) is added.

Within the wireless network control apparatus 101, after the base-station communication section 201 receives the registration response 403, the UTRAN control section 202 extracts various identifiers from the registration response 403. The UTRAN control section 202 registers extracted identifiers into the base-station management table 206. When the main base station ID of the registration response 403 does not exist in the base-station management table 206, the control section creates entries for cells to the number of cells designated in the registration response 403, and adds information of corresponding cell IDs in PLMN and cell IDs in RAN. As a result, a first line of the base-station management table 206 is created. Similarly, the second line of the base-station management table 206 is created by repeating the above registration procedure between the wireless network control apparatus 101 and the main base station 102b.

The registration processing sequence is merely an example, and it can be easily analogized that even if an operational management (O&M) system is used for registration, if registered results are the same, the same advantages as in the embodiment are obtained.

Next, operation of the radio control system in the case that the terminal is moved from the cell (a) to the cell (b) is described. First, summary is described. In the embodiment, since both the first sub base station 103a and the second sub base station 103b are connected to the first main base station 102a, when the terminal 104 is moved from the cell (a) to the cell (b), the MDC is performed in the first main base station 102a. Thus, only the dedicated channel set between the wireless network control apparatus 101 and the first main base station 102a is assumed to be used even in the site diversity.

Figure 5:
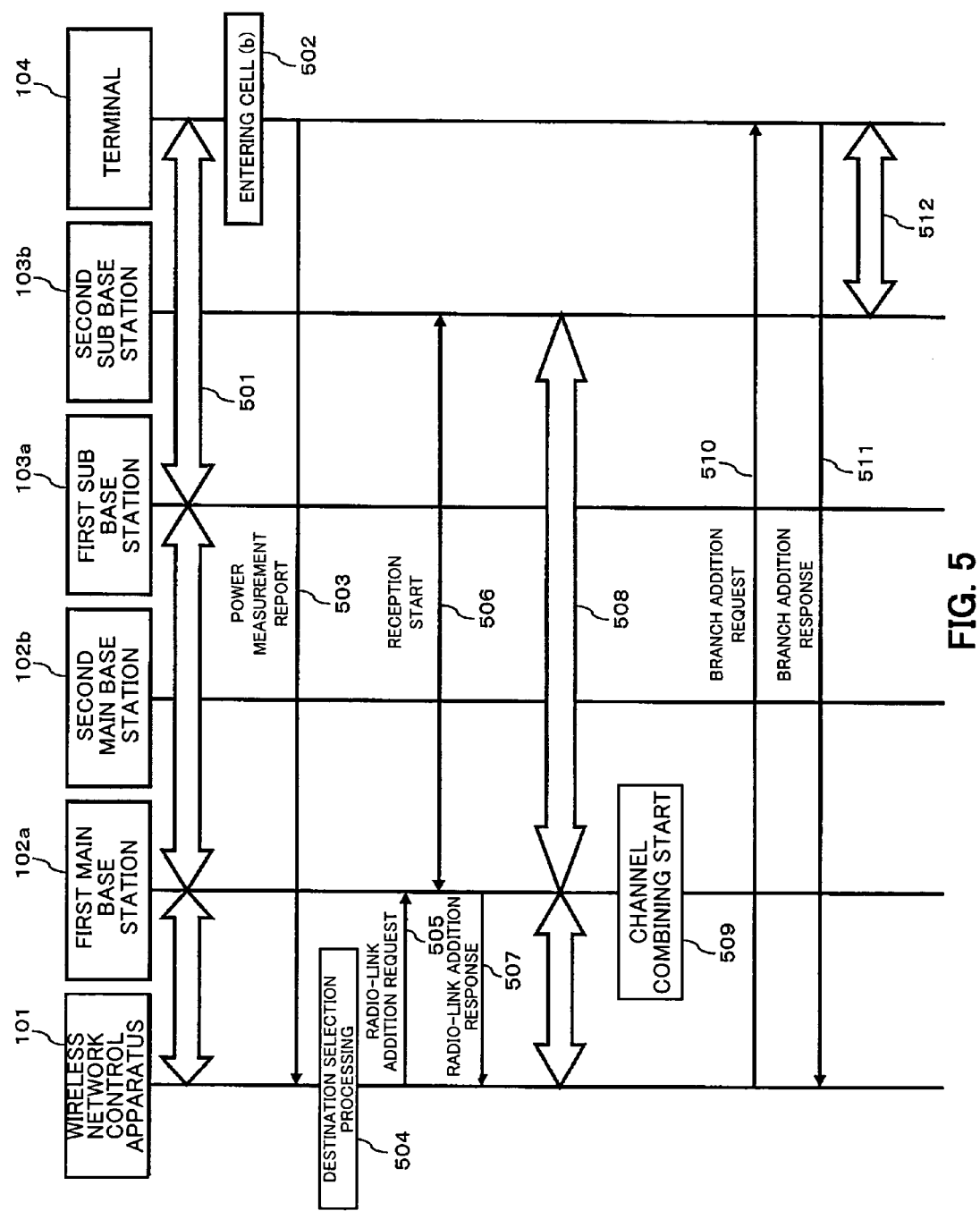
FIG. 5 is a sequence diagram of processing in the first embodiment.

FIG. 5 is a sequence diagram showing branch addition processing in this case. Hereinafter, the branch addition processing is described according to FIG. 5. A signal 501 indicates a communication channel of a dedicated channel of the terminal 104a. First, the terminal 104a communicates with the wireless network control apparatus 101 via the first sub base station 103a and the first main base station 102a using the dedicated channel. At that time, Active Set indicating a destination cell of the terminal 104a is only the cell (a).

When the terminal 104a is moved to the position of the terminal 104b (event 502) and enters the cell (b), the terminal 104b transmits information of power measurement between the terminal and the second sub base station 103b as a power measurement report 503 to the wireless network control apparatus 101.

The wireless network control apparatus 101 detects a fact that the terminal 104b enters the cell (b) and becomes communicatively connectable by the power measurement report 503 transmitted from the terminal 104b, and determines whether site diversity can be performed or not. When communication quality between the second sub base station 103b and the terminal 104b becomes stable and thus the site diversity is allowed, the wireless network control apparatus 101 performs destination selection processing 504, and outputs a radio link addition request 505 for setting a new communication channel to the first main base station 102a. An added radio link is designated by a radio link ID which indicates connection in RAN and uniquely determined in UE. The radio link ID corresponds to RL ID in NBAP, and the radio link addition request 505 corresponds to RADIO LINK ADDITION REQUEST in NBAP.

Here, detail of the destination selection processing 504 is described with reference to FIG. 7. First, the UTRAN control section 202 of the wireless network control apparatus 101 acquires a cell ID in RAN of the cell (b) that the terminal 104b has entered (ST701). In the embodiment, in response to the radio link addition request, since the cell ID in PLMN is (b) as a cell ID in a default RAN of the cell (b) 3 is acquired by the UTRAN control section 202.

Next, the wireless network control apparatus 101 extracts information on a main base station 102 included in both the entered cell and Active Set, and then stores it into a destination candidate list 207 (ST702). In this case, since the Active Set of the terminal 104b is cell (a), and the entered cell is cell (b), the main base station 102 included in the two is the first main base station 102a, and information on the first main base station 102a is extracted from the base-station management table (refer to FIG. 3).

An identifier of the cell (b) is added to the Active Set. In the embodiment, two cells of the cell (a) and cell (b) are given as the Active Set of the terminal 104b.

Next, the wireless network control apparatus 101 determines presence of the main base station 102 included in both the entered cell and Active Set (ST703). In the embodiment, since the first main base station 102a corresponds to it, the processing is advanced to a flow where the main base station 102 is present (YES in the step ST703).

The following steps ST704 to ST709 are processing where when at least two cells of Active Set are already present, and a plurality of candidates of main base stations as destination are present, main base stations 102 that perform communication are selected. In the case of the embodiment, since only one main base station as destination is present, the first main base station 102a is selected as the main base station 102 as destination again in a step ST710.

In steps ST704 to ST709, process in the case that a plurality of main base stations are present is briefly described. In this process, first, a main base station which currently has the largest numbers of connection with the terminal is selected in the step ST704 and step ST705. Next, a default main-base-station of the entered cell is selected in a step ST706. As a result, the processing branches into a step ST707, step ST708, and step ST709, and a main base station suitable for each case is selected, and the selected base station becomes the main base station as destination. That is the operation of the detail of the destination selection processing 504.

Return to FIG. 5, the first main base station 102a starts transmission/reception to/form the second sub base station 103b according to the radio link addition request 505 (signal 506), and then secures an additional communication channel to the wireless network control apparatus 101, and furthermore starts MDC in the first main base station 102a. After that, the first main base station 102a transmits a radio link addition response 507 in response to the radio link addition request 505 to the wireless network control apparatus 101. The radio link addition response 507 corresponds to RADIO LINK ADDITION RESPONSE in NBAP. After the above processing is finished, communication of a dedicated channel is started between the first main base station 102a and the second sub base station 103b as shown by a signal 508. Then, combining of the dedicated channel is started by the first main base station 102a in an event 509.

When the radio link addition request 507 is inputted into the wireless network control apparatus 101, the wireless network control apparatus 101 outputs a branch addition request 510 designating a scrambling code or the cell ID in PLMN of a radio link as an addition object via the cell (b) to the terminal 104b in order to add the cell (b) to Active Set. The branch addition request corresponds to ACTIVE SET UPDATE in 3GPP RRC, and information of the added radio link corresponds to Radio Link Addition Information. When the terminal 104b receives the branch addition request, it outputs a branch addition response 511 to the wireless network control apparatus 101. The branch addition response corresponds to ACTIVE SET UPDATE COMPLETE in 3GPP RRC.

According to the above procedure, the terminal 104b starts communication with the second sub base station 103b using a channel having a number designated by the branch addition request 510 as shown in a signal 512. Since the channel is connected to the first main base station 102a, site diversity can be performed in the first main base station 102a.

Next, operation of the radio control system in the case that the terminal 104 is moved from the cell (b) to the cell (a) is described. Summary of the case is described. An original position of the terminal 104 is the cell (b), and a default main-base-station is the second main base station 102b, which is different from the first main base station 102a as the default main-base-station of the cell (a) as destination. Therefore, the main base station is changed from the second main base station 102b to the first main base station 102a during performing the site diversity in order to narrow channels between the wireless network control apparatus 101 and the main base station 102 to only one.

Figure 6:
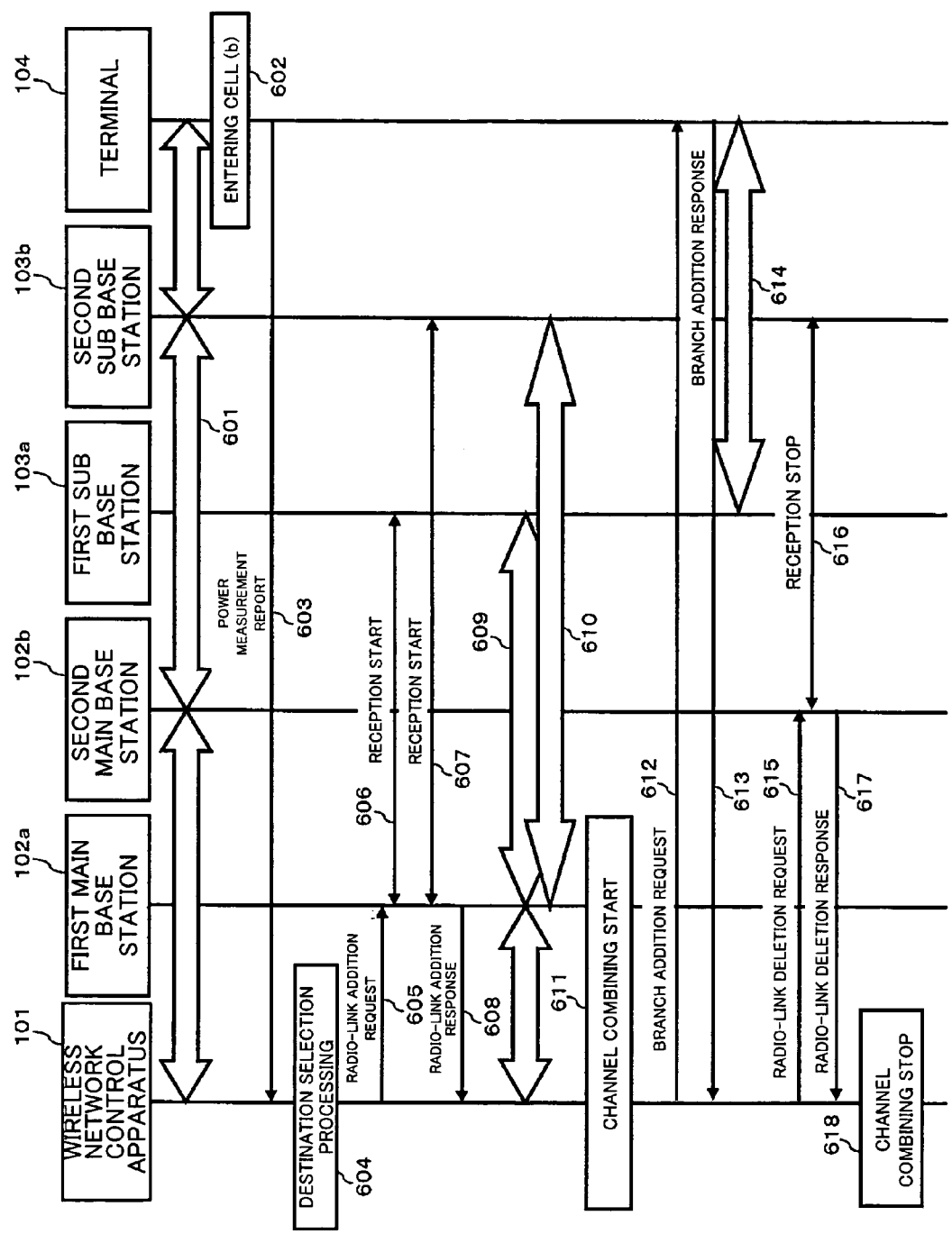
FIG. 6 is a sequence diagram of processing in the first embodiment.

FIG. 6 is a diagram showing operation of the radio control system in the case that the terminal 104 is moved from the cell (b) to the cell (a). Hereinafter, a processing method is described using FIG. 6. When the terminal is moved from the cell (b) to the position of the terminal 104b, the terminal 104b detects a pilot signal outputted by the first sub base station 103a, and outputs a power measurement report 603. When the wireless network control apparatus 101 receives the power measurement report 603, it detects a fact that the terminal 104 has entered the cell (b), and performs processing of destination selection. The wireless network control apparatus 101 determines to perform site diversity between the first main base station 102a and the second main base station 102b in the cell (b) (cell IDs in RAN are 2 and 3), and in the cell (a) in addition to this.

Figure 7:
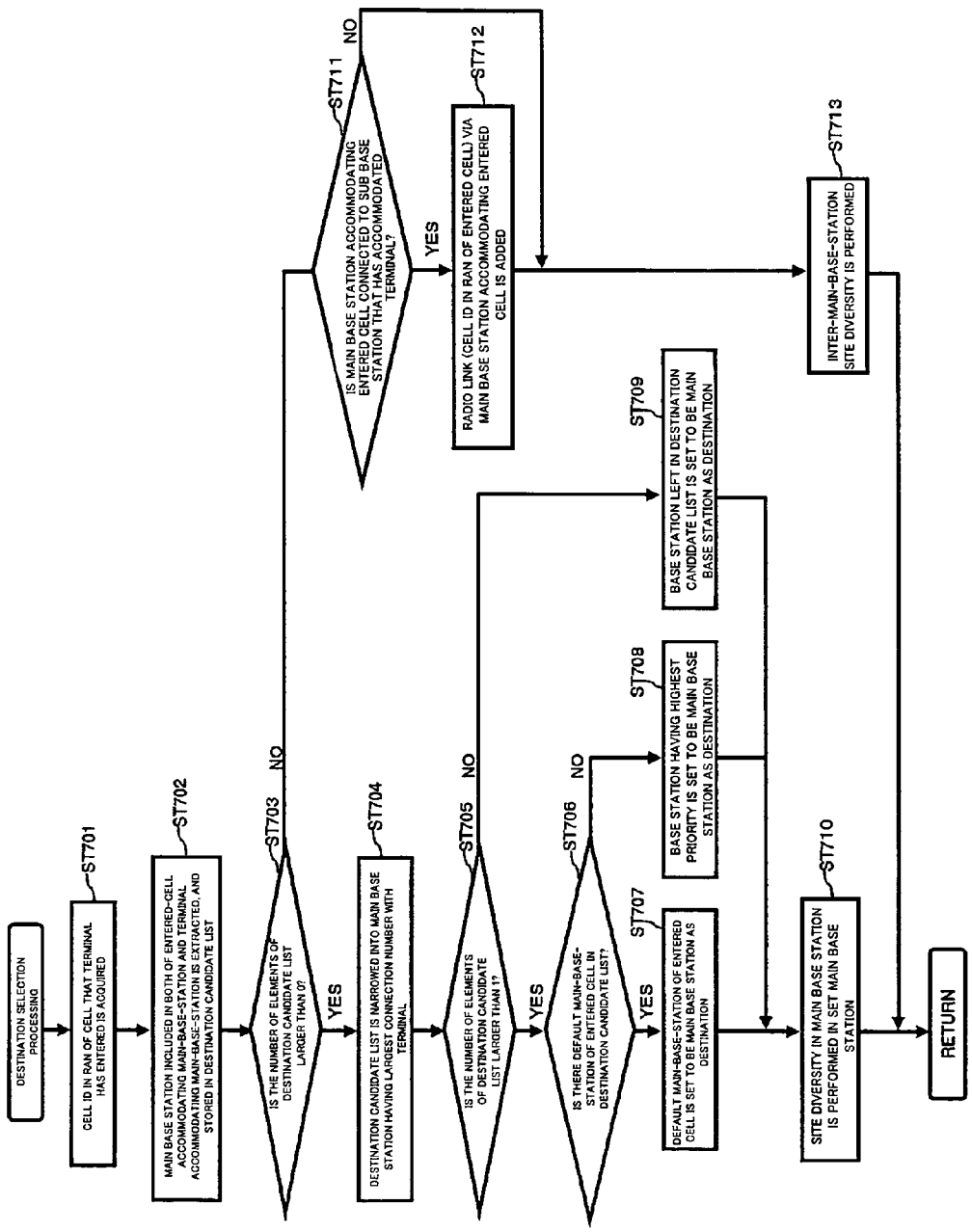
FIG. 7 is a flowchart of destination selection processing in the first embodiment.

FIG. 7 shows detail of destination selection processing. In this case, since such determination is made in the ST703 that a common main base station included in both the base station that accommodates the cell (a) as destination and the base station that accommodates the terminal before movement does not exist, and a destination candidate list does not have any element, the processing is advanced to ST711. In the ST711, the main base station, which accommodates the cell to which the terminal 104 entered, determines presence of connection with the sub base station that has accommodated the terminal 104. In the case of the embodiment, the terminal 104 is accommodated in the second sub base station 103b as original, and the second sub base station 103b is connected to the first main base station 102a and the second main base station 102b. On the other hand, the cell (a) as destination is connected to the first main base station 102a. Accordingly, since the first main base station 102a is connected to both the destination cell and the original cell, determination is made as YES in ST711, and the processing is advanced to the ST712.

In the ST712, a radio link via connection between the main base station 102a that accommodates the cell to which the terminal entered, and the sub base station 103b having the original cell as a cover area is added to the radio link as the addition object due to movement. In the embodiment, a radio link using connection of the cell ID in RAN: 2, which indicate connection between the first main base station 102a and the second sub base station 103b, is assumed to be the addition object.

In ST713, the site diversity between the main base stations is started. This is the end of description of the destination selection processing (FIG. 7).

Return to FIG. 6, the wireless network control apparatus 101 transmits a radio link addition request 605 for adding two radio links of a link via the first sub base station 103a and a link via the second sub base station 103b to the first main base station 102a selected in the event 604. When the first main base station 102a receives the radio link addition request 605, it performs processing of adding a required radio link in reception starting processing of signals 606, 607. When the first main base station 102a transmits a radio link addition response 608 to the wireless network control apparatus 101, the wireless network control apparatus 101 and the first main base station 102a starts combining of channels in an event 611. The wireless network control apparatus 101 performs adjustment of a signal level and the like as necessary to combine an overlapped, up signal from both the first main base station 102a and the second main base station 102b.

When the above processing is finished, the wireless network control apparatus 101 transmits a branch addition request 612 of the cell (a) (cell ID in RAN: 1) and the cell (b) (cell ID in RAN: 2) to the terminal 104b. The terminal 104b transmits a branch addition response 613 to the wireless network control apparatus 101. The branch addition request 612 and the branch addition response 613 correspond to ACTIVE SET UPDATE and ACTIVE SET UPDATE COMPLETE in RRC respectively, as described before. As a result, as shown by a signal 614, the terminal 104*b* starts communication of the dedicated channel with respect to the cells.

In this way, when the radio link is added in the ST712 of FIG. 7, radio links are temporarily set to a plurality of main base stations 102*a*, 102*b* from the sub base station 103*b*. Therefore, after a branch is added, processing for deleting such an overlapped radio link to eliminate overlap of radio links is necessary. Thus, processing of deleting a branch of the second main base station 102*b* as an excessive branch among channels between the wireless network control apparatus 101 and the terminal 104*b* is performed.

The wireless network control apparatus 101 transmits a radio link deletion request 615 for deleting a channel via the second sub base station 103*b* with the cell (b) as a cover area to the second main base station 102*b*. As the radio link deletion request, RADIO LINK DELETION REQUEST in NBAP of 3GPP is used.

The second main base station 102*b* performs processing of deleting a requested channel in response to the radio link deletion request 615. When reception stop processing of a signal 616 is finished, the second main base station 102*b* outputs a radio link deletion response 617 to the wireless network control apparatus 101. As the radio link deletion response 616, RADIO LINK DELETION RESPONSE in RRC of 3GPP is used. As a result, the combining of channels is stopped in an event 618.

In the case that branch deletion is carried out after the terminal 104 is completely moved to the destination cell, the radio link through the original cell can be deleted according to the same procedure as a typical branch deletion procedure (Active Set Update and Radio Link Deletion Procedure of 3GPP standard are used).

As described hereinbefore, in the embodiment, the wireless network control apparatus 101 manages a relationship between main base stations under the device and cells, and performs appropriate channel setting in response to the branch addition request of the terminal, thereby site diversity can be performed in the main base station 102. Thus, network bands between the wireless network control apparatus 101 and the main base station 102 can be reduced, in addition, processing load on the wireless network control apparatus 101 can be reduced.

The sequence shown in the embodiment is merely an example, and it can be easily analogized that even if the order of the sequence is partially changed, the same advantages are obtained.

Second Embodiment

Next, a radio control system of a second embodiment is described. First, summary of the radio control system of the second embodiment is described. In the second embodiment, direct connection (communication channel) is provided between a first main base station 802*a* and a second main base station 802*b*, and when the terminal 104 is moved between cells, whether site diversity in a main base station 802 can be performed or not is determined by the main base station 802, and if it is determined to be possible, it is performed. Thus, even if an existing base station that does not accept the functionally-distributed base station is used for the wireless network control apparatus 101, the number of channels between the wireless network control apparatus 101 and the main base station 802 can be reduced during site diversity.

Figure 8:
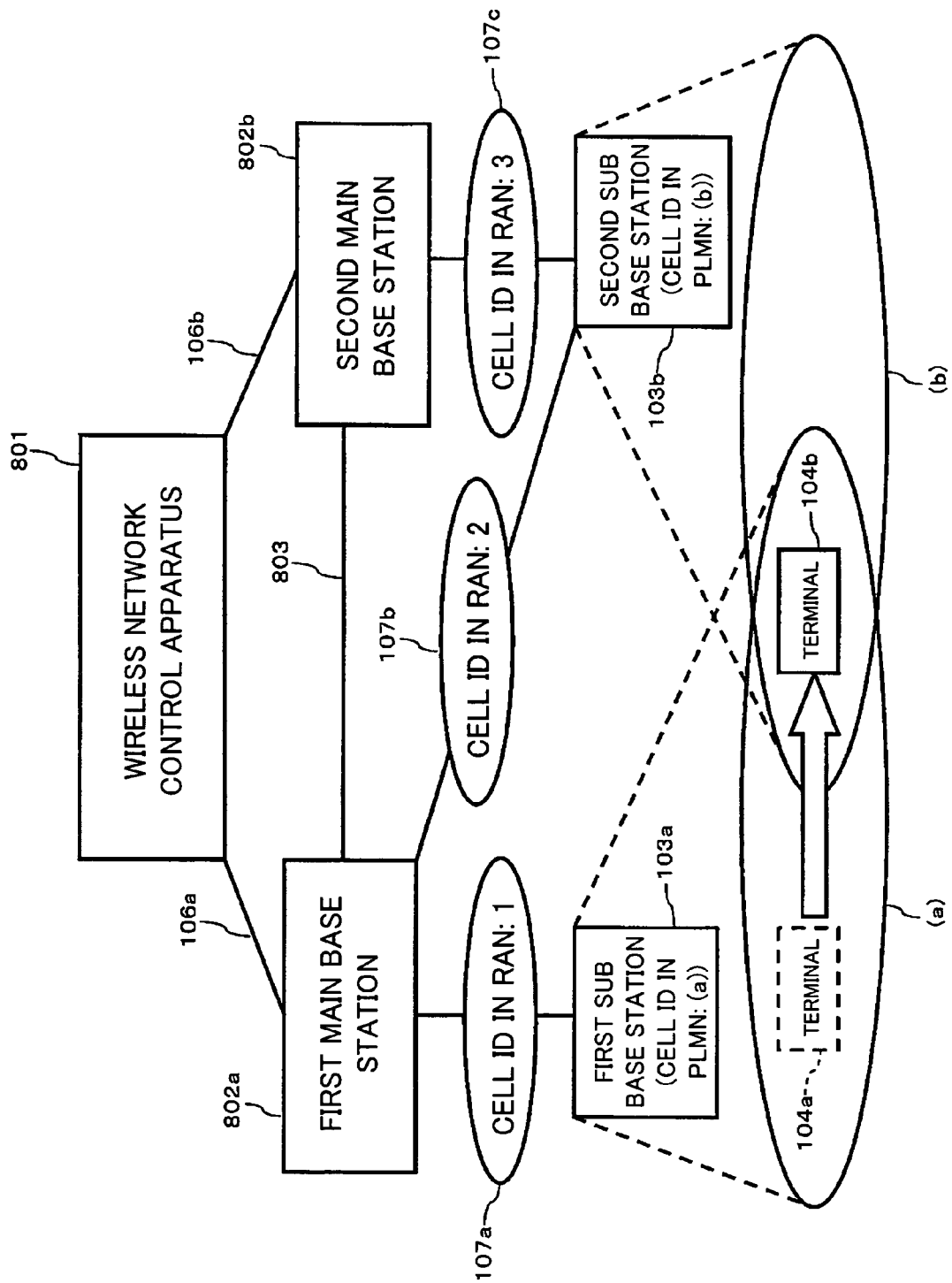
FIG. 8 is a general block diagram of a radio access network in a second embodiment.

A block diagram of the embodiment is shown in FIG. 8. As shown in FIG. 8, in a radio control network of the second embodiment, the main base station 802*a* is connected to the main base station 802*b* through a communication channel 803 in addition to a configuration of the first embodiment. In the second embodiment, the main base station 802 knows a relation between the main base station 802 and a sub base station 103. A wireless network control apparatus 801 has the same configuration as that of the wireless network control apparatus in the related art, and does not know a cell shared by a plurality of main base stations 802.

The main base station 802 knows a network configuration between the main base station 802 and the sub base station 103, and a terminal 104 under the main base stations 802. Thus, when the terminal 104 is moved to enter a new cell, and a radio link addition request is outputted from the wireless network control apparatus 101 to the main base station 802 that controls a destination cell by default, whether the main base station 802 shares the sub base station 103 with a main base station 802 that controls an original cell or not is determined. If it is shared, a radio link via the original main base station 802 is added, which is noticed to the wireless network control apparatus 101, thereby the site diversity in the original main base station 802 is realized.

Figure 9:
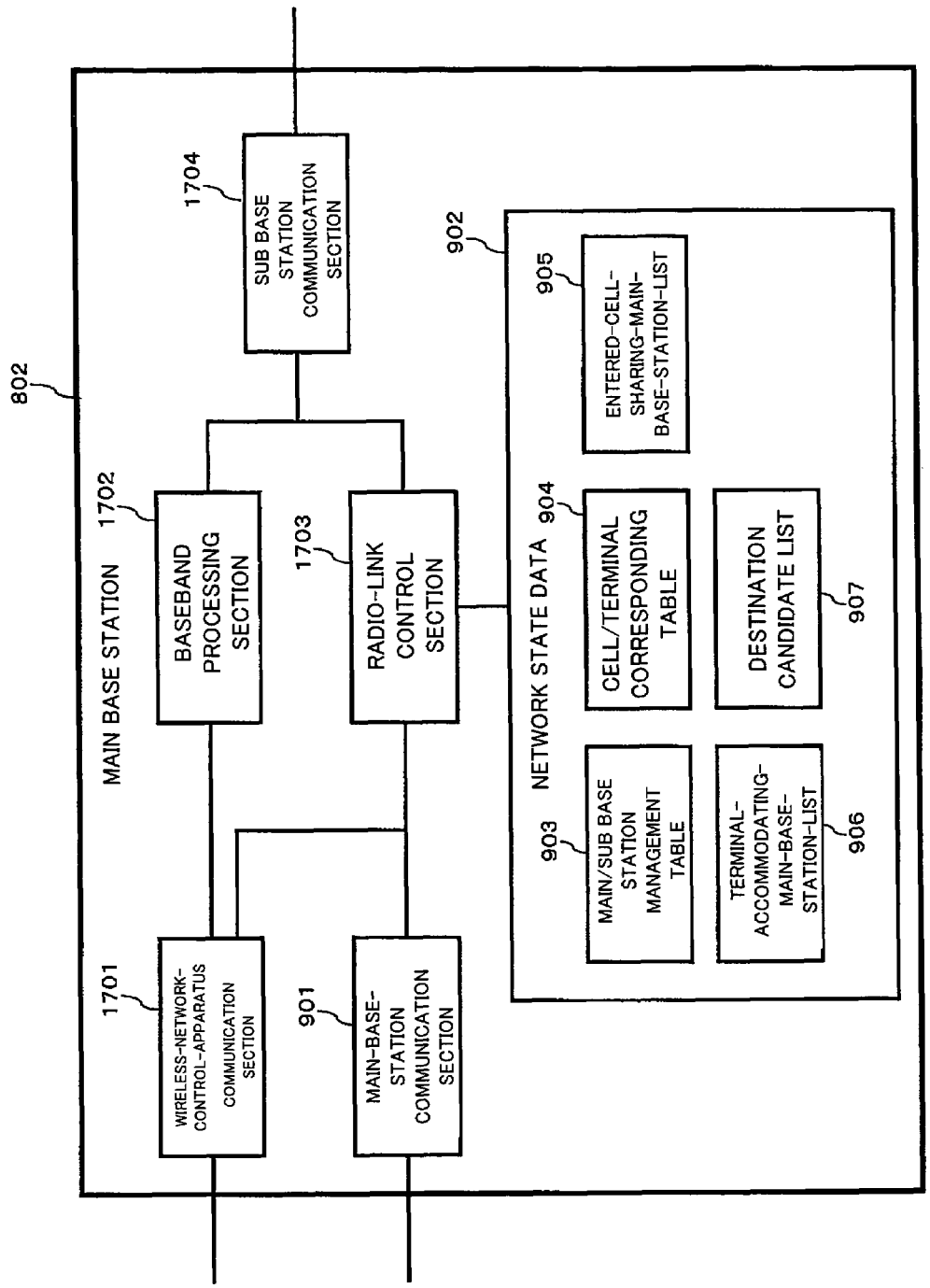
FIG. 9 is a block diagram of a main base station in the second embodiment.
Figure 17:
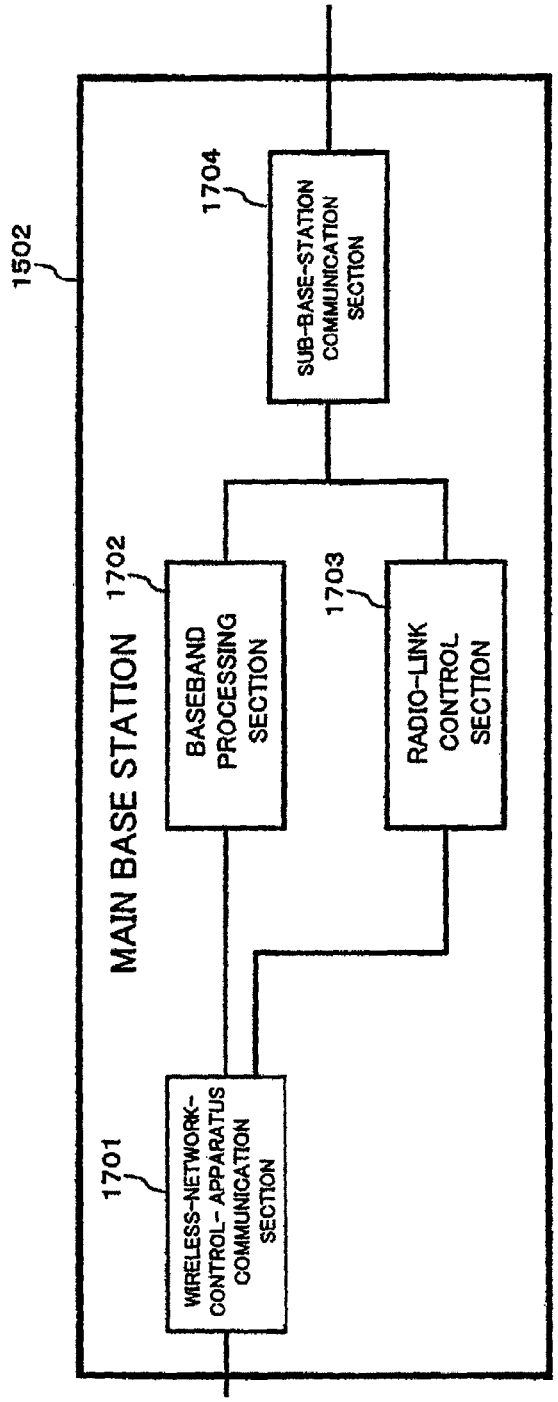
FIG. 17 is a block diagram of a main base station in the related art.
Figure 18:
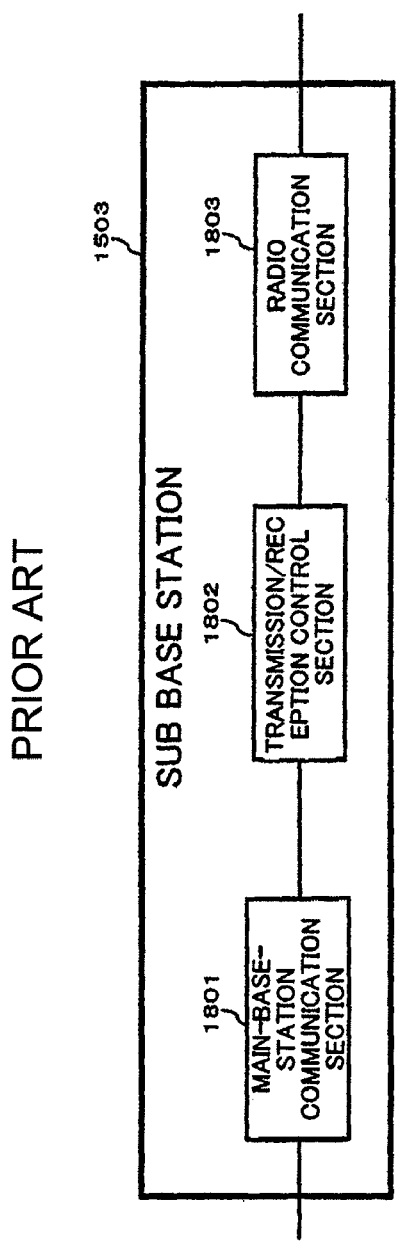
FIG. 18 is a block diagram of a sub base station in the related art.
Figure 19:
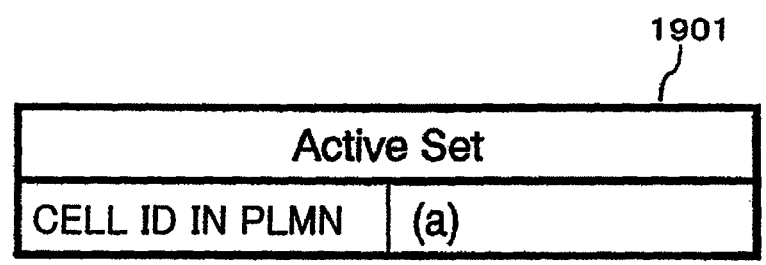
FIG. 19 is a data field diagram of Active Set in the related art.
Figure 21:
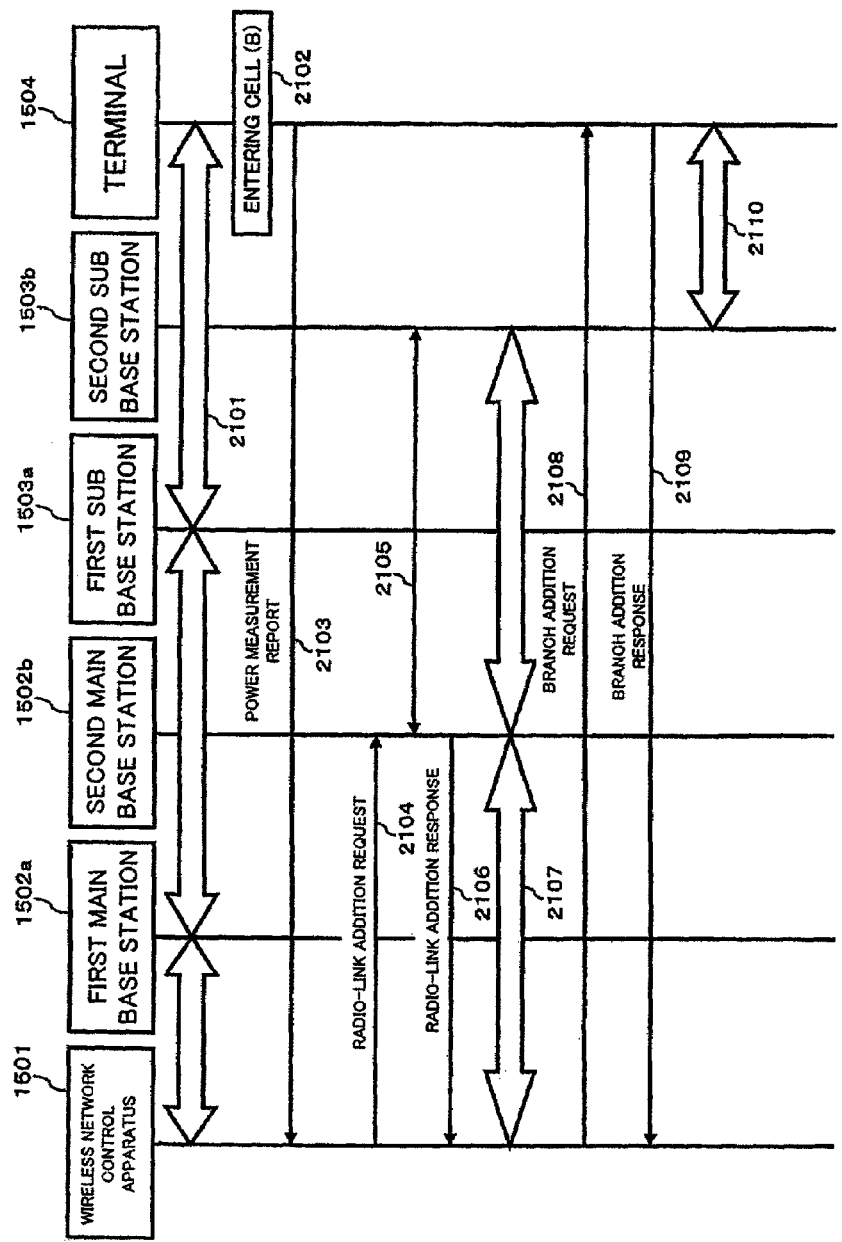
FIG. 21 is a flowchart of destination selection processing in the related art.

FIG. 9 is a diagram showing an internal configuration of the main base station 802. Regarding a functional configuration of the main base station 802, a configuration from a wireless-network-control-apparatus connection section 1701 to a sub-base-station connection section 1704 is the same as in the base station 1502 in the related art as shown in FIG. 17. However, a radio link control section 1703 has a function of determining whether a mobile terminal detected in the base station is in communication with another base station or not, a function of searching a base station that can communicate with a plurality of relay stations including a relay station associated with another station, and a function of connecting communication between a searched base station and respective relay stations. The radio link control section 1703 is a configuration corresponding to "determination means", "search means", or "control means" in claims. A main-base-station communication section 901 is an interface to another main base station 802. The main-base-station communication section 901 is a configuration corresponding to "inter-base-station communication means" in claims. Network state data 902 are data of a radio access network managed by the main base station 802. Data from a main/sub-base-station management table 903 to a destination candidate list 907 are stored as the network state data 902. In the embodiment, since the network state data 902 are disposed in the main base station 802, the data such as cell ID in PLMN or Active Set managed by the wireless network control apparatus 801 in the first embodiment are not included in the network state data. Among the network state data 902, the main/sub base-station corresponding table 903 and a cell/terminal corresponding table 904 are described in detail below.

Figure 12:
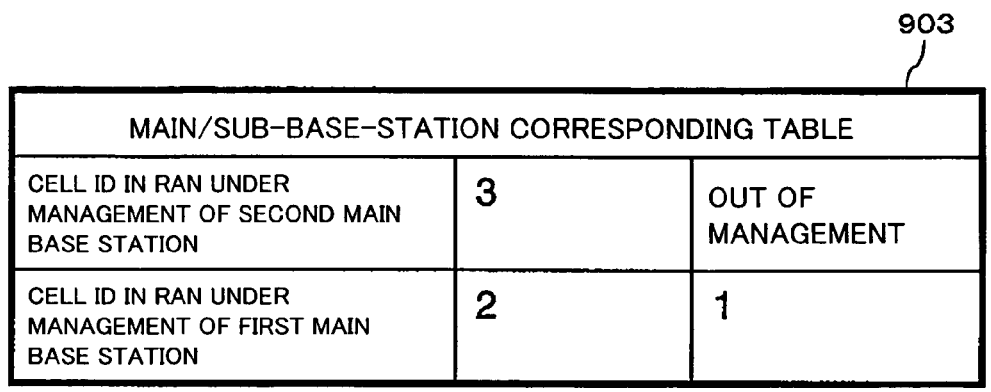
FIG. 12 is a data diagram of a main/sub-base-station correspondence table in the second embodiment.

FIG. 12 is a data field diagram of the main/sub-base-station corresponding table 903 in the second main base station 802*b*. A first line of the main/sub-base-station corresponding-table 903 shows entry of the second main base station 802*b* itself. The entry includes all cell IDs in RAN under the second main base station 802*b* and "out of management (of the second main base station 802*b*)".

Data of all the main base stations 802 connected to the second main base stations 802*b* are stored in a second line or below of the main/sub-base-station corresponding table 903. The main/sub-base-station corresponding table 903 is a configuration corresponding to "management table" in claims. In the embodiment, since only the first main base station 802*a* is connected the second main base station 802*b*, data are ended to be stored with the second line. The second line is made correspondent with a cell ID in RAN in the same cell as a cell of the second main base station 802b in the first line. In the case of the embodiment, since the first main base station 802a and the second main base station 802b share the cell (b), a cell ID in RAN: 2 of the cell (b) of the first main base station 802a is stored in a column of a cell ID in RAN: 3 of the cell (b) of the second main base station 802b. Since a cell that is shared between the first main base station 802a and the second main base station 802b is not present other than this, cell ID in RAN: 1 of the cell (a) of the first main base station 802a is stored in a column of the "out of management".

Figure 13:
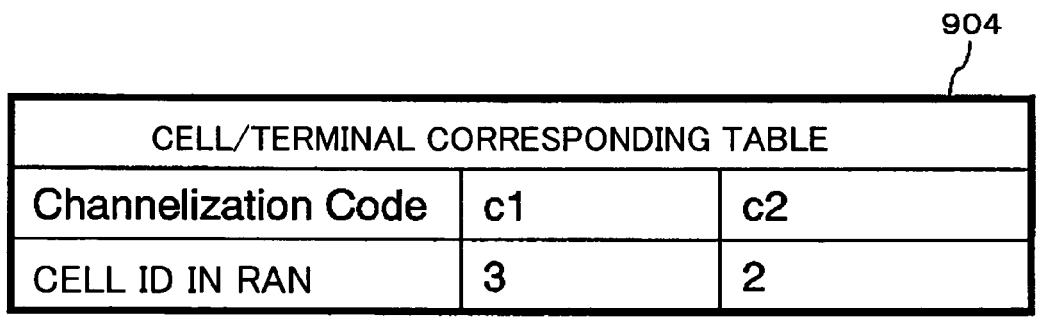
FIG. 13 is a data diagram of a cell/terminal correspondence table in the second embodiment.

FIG. 13 is a data field diagram of the cell/terminal corresponding table 904 in the second main base station 802b. A first line shows channelization codes.

Here, the channelization codes are described. The channelization codes are part of symbols used in code modulation of CDMA, and allocated for each of the base stations 102. The channelization codes correspond to terminal IDs on one-on-one. The terminal IDs are identifiers indicating terminals. Since the channelization codes are also allocated for each of the terminals, the terminal IDs can be used instead of the channelization codes in a portion where the channelization codes are used except for baseband modulation.

A second line of the cell/terminal corresponding table 904 shows a cell ID in RAN of each of cells of radio links held by terminals corresponding to channelization codes of the first line. While site diversity is performed, plural number of the cell IDs in RAN are given. In an example shown in FIG. 13, a terminal having a channelization code c1 (the terminal 104a is supposed) holds a radio link of a cell ID in RAN: 3, and a terminal having a channelization code c2 holds a radio link of a cell ID in RAN: 2.

Hereinafter, operation of the radio control system of the embodiment is described. In the following description, (1) content of default, (2) a case where the terminal in the cell (a) establishes a dedicated channel, (3) processing that the terminal in the cell (a) enters the cell (b) and then a branch is added are described in detail.

First, the content of default is described. In the embodiment, the main base station 802 has the main/sub-base-station corresponding table 903 for managing the cell IDs in RAN in all the sub base stations 103 connected to the main base station 802. The main base station 802 has the cell/terminal corresponding table 904 that is a corresponding table between terminals under the main base stations 802 and the cell IDs in RAN. This can prevent a phenomenon that up communication (such as PRACH) of a terminal 104 accommodated by a sub base station 103 shared by a plurality of main base stations 802 is relayed from a plurality of main base stations 802 to the wireless network control apparatus 801 at the same time. Moreover, in order to determine whether a signal from a terminal that newly sends out a request via the sub base station 103 is transmitted to the wireless network control apparatus 801 or not, the main base station 802 has information of a sub base station 103 that performs processing of a new request. The information indicates a default main-base-station 802 of the sub base station 103. In the embodiment, the default main-base-station 802 of the sub base station 103b is the first main base station, and the second main base station 802b performs processing of addition of a new dedicated channel from the second sub base station 103b and the like. On the other hand, the first main base station 802a does not perform processing associated with the second sub base station 103b unless an explicit request such as site diversity is given.

Hereinafter, processing of default of the base station 802 is described. Sequence of the processing is the same as the sequence shown in FIG. 4. When setting of a main base station 802 is changed, the main base station 802 outputs a registration reserve notice 401 to the wireless network control apparatus 801. The registration reserve notice 401 corresponds to AUDIT REQUIRED INDICATION in NBAP.

When the wireless network control apparatus 801 receives the registration reserve notice 401, it transmits a registration request 402 to the main base station 802 as a sender of the registration reserve notice 401. This processing is performed by the base station communication section and a call control section within the wireless network control apparatus 801. The registration request 402 corresponds to AUDIT REQUIRED in NBAP.

Even if the registration reserve notice 401 is not given from the main base station 802, the registration request 402 can be outputted from the wireless network control apparatus 801 to start registration sequence. In response to the registration request 402, the main base station 802 outputs a main base station ID of the main base station 802 itself, cell IDs in RAN and cell IDs in PLMN of all connected sub base stations 103 to the wireless network control apparatus 801 as a registration response 403. The registration response 403 corresponds to AUDIT RESPONSE in NBAP. In the case of the first main base station 802a, since there are two cells under the station, it outputs 1 and 2 a cell IDs in RAN of the cells.

When the wireless network control apparatus 801 receives the registration response 403, UTRAN control section extracts various identifiers from the registration response 403.

In this case, unlike the first embodiment, only a relation between main base stations and cell IDs in RAN is managed in the wireless network control apparatus 801, and information on a phenomenon that different cell IDs in RAN indicate the same cell can not be seen. Therefore, in the wireless network control apparatus 801, a relation between the main base stations 802 and the sub base stations 103 looks one-to-many.

Regarding the network state data 902 in the main base station 802, the data can be registered via an operating management system.

When a configuration including a main base station 802 and a sub base station 103 is changed, surrounding main base stations 802 can change network state data 902, for example, by notifying a cell ID in RAN of a sub base station that is newly added or deleted to the surrounding main base stations 802 by the main base station 802 having a changed configuration.

Next, the opening of a new dedicated channel is described. In the embodiment, the wireless network control apparatus 801 does not have information on sub base stations 103a, 103b shared by a plurality of main base stations 802a, and 802b. Each of the main base stations 802a, 802b knows sharing information on sub base stations 103a, 103b connected to surrounding main base stations 802a, 802b and a terminal 104 under the sub base stations, and transfers a request to the terminal 104 to an appropriate main base station 802. In the embodiment, when the terminal 104 under the sub base station 103 is added, deleted, or changed, for example, when a new dedicated channel is opened, procedure of transferring action information of such processing to surrounding main base stations 802 using connection between the main base station 802a and the main base station 802b is necessary.

Figure 10:
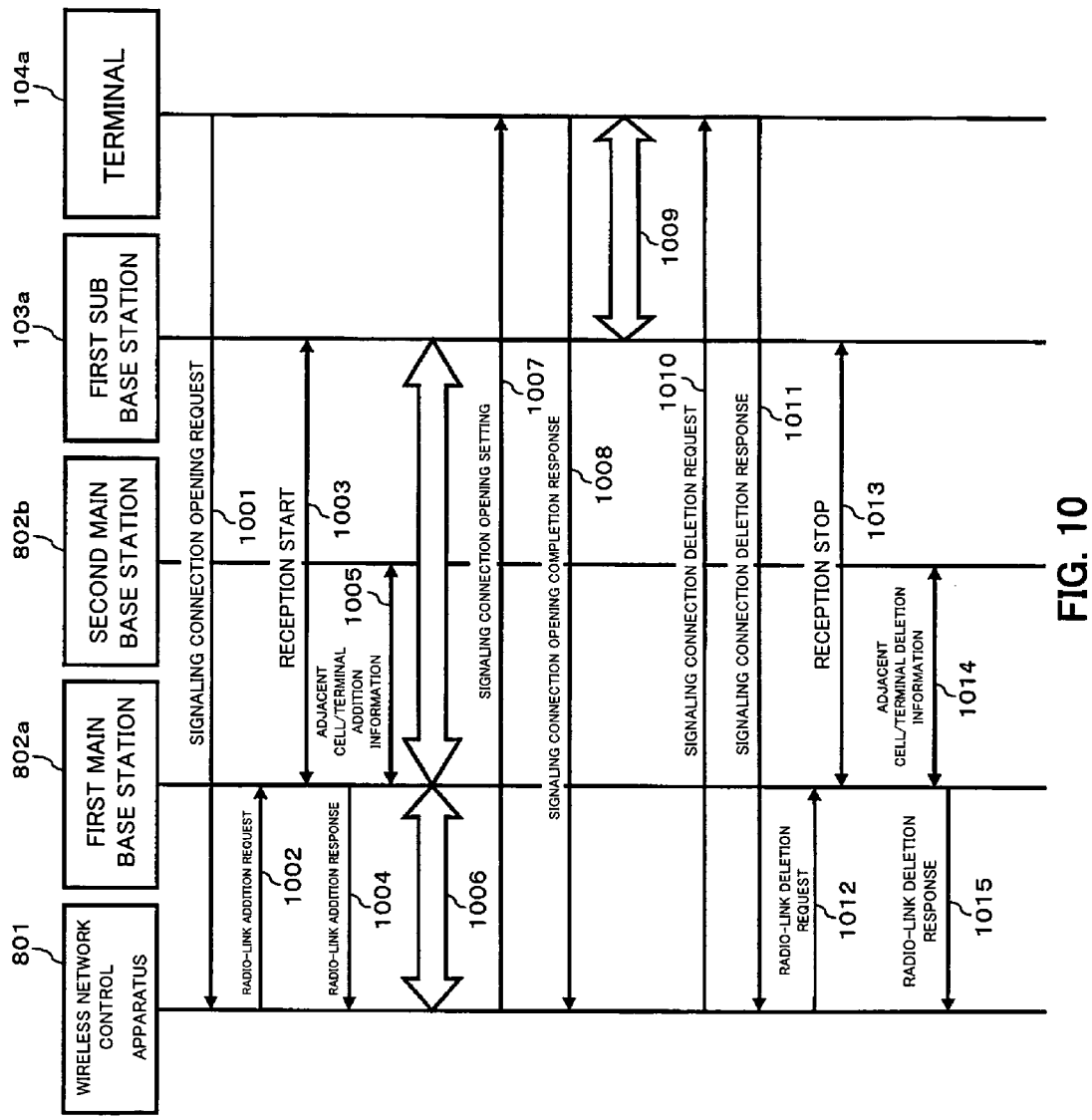
FIG. 10 is a sequence diagram of processing in the second embodiment.

Hereinafter, processing of opening a new dedicated channel is described with reference to FIG. 10. In the case of opening the new dedicated channel, the terminal 104a outputs a signaling connection opening request 1001 to the wireless network control apparatus 801 via the first sub base station 103*a* and the first main base station 802*a*. In 3GGP, RRC CONNECTION REQUEST of RRC is used for this.

Next, the wireless network control apparatus 801 transmits a radio link addition request 1002 to the first main base station 802*a*. In 3GGP, RADIO LINK SETUP REQUEST in NBAP is used for this. In response to this, in the first main base station 802*a*, communication procedure to the terminal 104*a* is started by a signal 1003, and a requested radio link addition response 1004 is outputted to the wireless network control apparatus 801. In 3GGP, RADIO LINK SETUP RESPONSE in NBAP is used for this.

At that time, the first main base station 802*a* sends out the channelization code c1 of the terminal 104*a* to the second main base station 802*b* as adjacent cell/terminal addition information 1005. The second main base station 802*b* has a terminal-accommodating-main-base-station-list 906 for managing the first main base station 802*a* and terminals under the station, and stores a channelization code included in the adjacent cell/terminal addition information 1005. After that, dedicated channel communication shown by a signal 1006 is started between the wireless network control apparatus 801 and the first sub base station 103*a*.

When the wireless network control apparatus 801 receives the radio link addition response 1004, it outputs a signaling connection opening setting 1007 to the terminal 104*a* using an identifier of an added radio link. This corresponds to RRC CONNECTION SETUP in 3GGP RRC. After the terminal 104*a* starts communication with the sub base station 103*a*, it transmits a signaling connection opening completion response 1008. This corresponds to RRC CONNECTION SETUP COMPLETE in 3GPP RRC. According to the above procedure, as shown in a signal 1009, communication is started from the terminal 104*b* to the first sub base station 103*a*. That is the processing in opening of the dedicated channel.

Next, processing of deletion of the dedicated channel is described. In the following description, corresponding protocol and message in 3GGP are appropriately mentioned in a parenthesis.

The wireless network control apparatus 801 transmits a signaling connection deletion request 1010 (RRC: RRC CONNECTION RELEASE) to the terminal 104*a*. In response to this, the terminal 104*a* stops the communication processing, and transmits a signaling connection deletion response 1011 (RRC: RRC CONNECTION RELEASE COMPLETE). After that, the wireless network control apparatus 801 transmits a radio link deletion request 1012 (NBAP: RADIO LINK DELETION REQUEST) to the first main base station 802*a*.

In response to this, the first main base station 802*a* sends out the channelization code c1 of the terminal 104*a* to the second main base station 802*b* as adjacent cell/terminal deletion information 1014. The second main base station 802*b* deletes a channelization code included in the adjacent cell/terminal deletion information and a corresponding cell ID in RAN.

When the above processing is finished, the first main base station 802*a* transmits a radio link deletion response 1015 (NBAP: RADIO LINK DELETION RESPONSE) to the wireless network control apparatus 801.

As described hereinbefore, since the main base stations 802 are connected to each other, and one base station notifies a connection state of the terminal 104 to another main base station 802 in channel connection or deletion, each main base station 802 can manage a state of the terminal connected to another main base station 802. Thus, efficient site diversity can be realized as described below.

Figure 11:
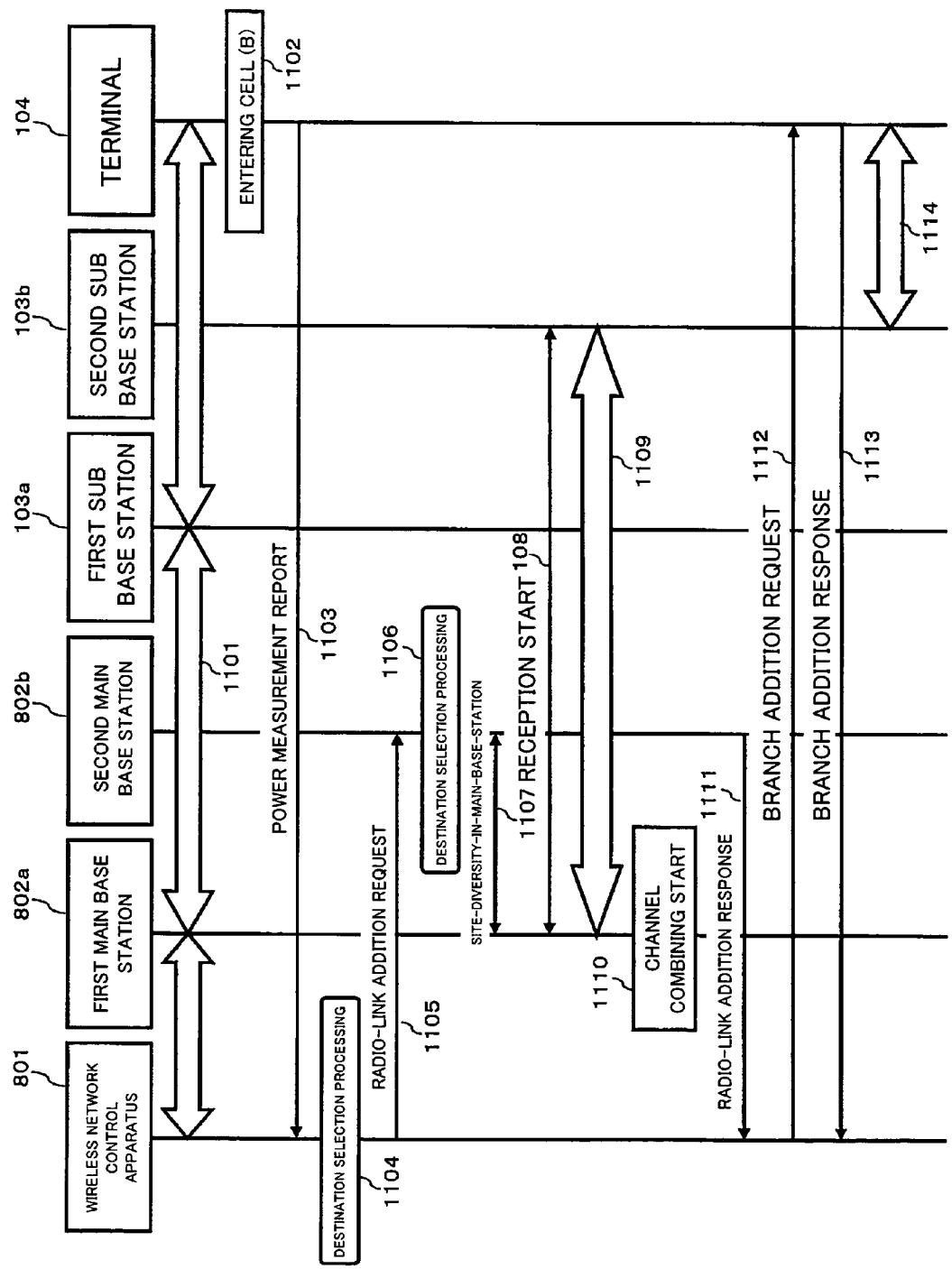
FIG. 11 is a sequence diagram of processing in the second embodiment.

Next, operation of the radio control system in the case that the terminal is moved from the cell (a) to the cell (b) is described with reference to FIG. 11.

A signal 1101 shows an initial state of the terminal 104*a*. The wireless network control apparatus 801 communicates with the terminal 104*a* situated in the cell (a) via the first main base station 802*a* and the first sub base station 103*a*.

Next, when the terminal 104*a* enters the cell (b), and arrives at the position of the terminal 104*b* (event 1102), the terminal 104*b* transmits information on received power to the wireless network control apparatus 801 as a power measurement report 1103 for each of a pilot signal received from the first sub base station 103*a* and a pilot signal received from the second sub base station 103*b*.

When the wireless network control apparatus 801 determines in the event 1104 that signal intensity from the second sub base station 103*b* to the terminal 104*b*, which is reported by the power measurement report 1103, is sufficiently large, it starts branch addition processing. At that time, in the power measurement report 1103, the cell (b) is expressed using the cell ID in PLMN: (b).

In the branch addition processing, the wireless network control apparatus 801 outputs a radio link addition request 1105 for the terminal 104*b* to the cell (b) and a corresponding second main base station 802*b*. In response to this, the second main base station 802*b* determines whether site diversity in the main base station is possible in this movement according to a flow chart of FIG. 14 (event 1106). In the embodiment, since both of the original cell (a) and the destination cell (b) are held by the first base station 802*a*, the site diversity in the main base station is determined to be possible.

Figure 14:
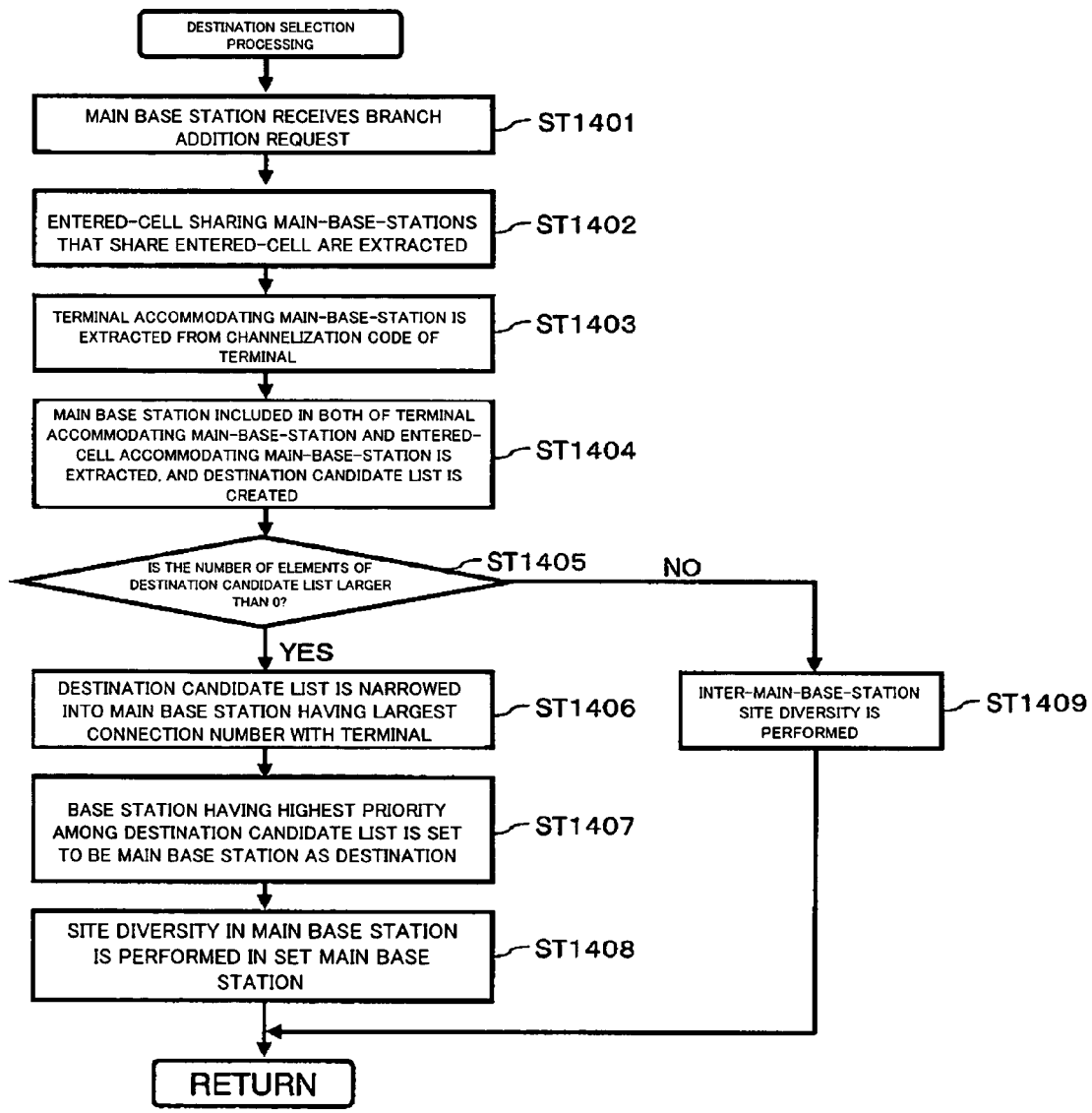
FIG. 14 is a flowchart of destination selection processing in the second embodiment.
Figure 15:
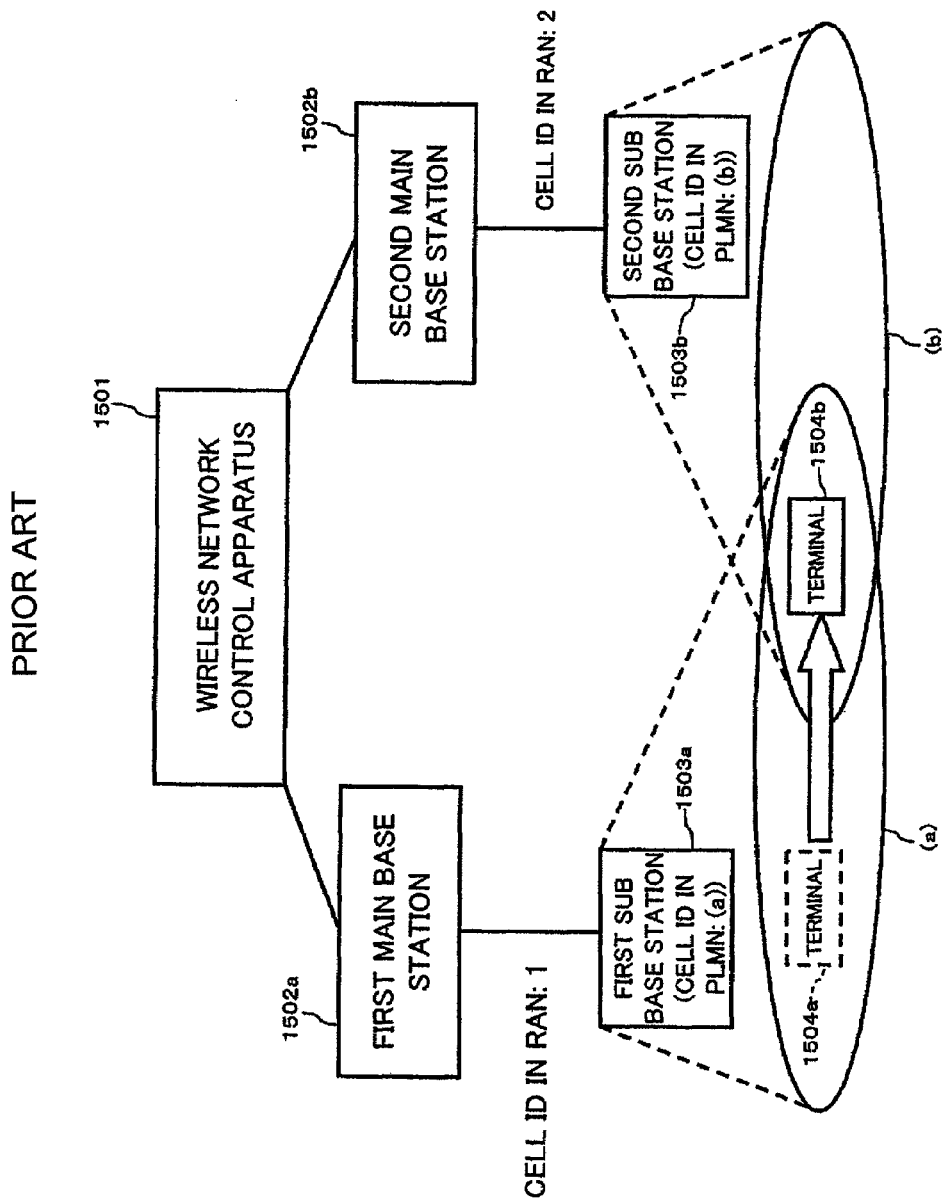
FIG. 15 is a general block diagram of a radio access network in the related art.
Figure 16:
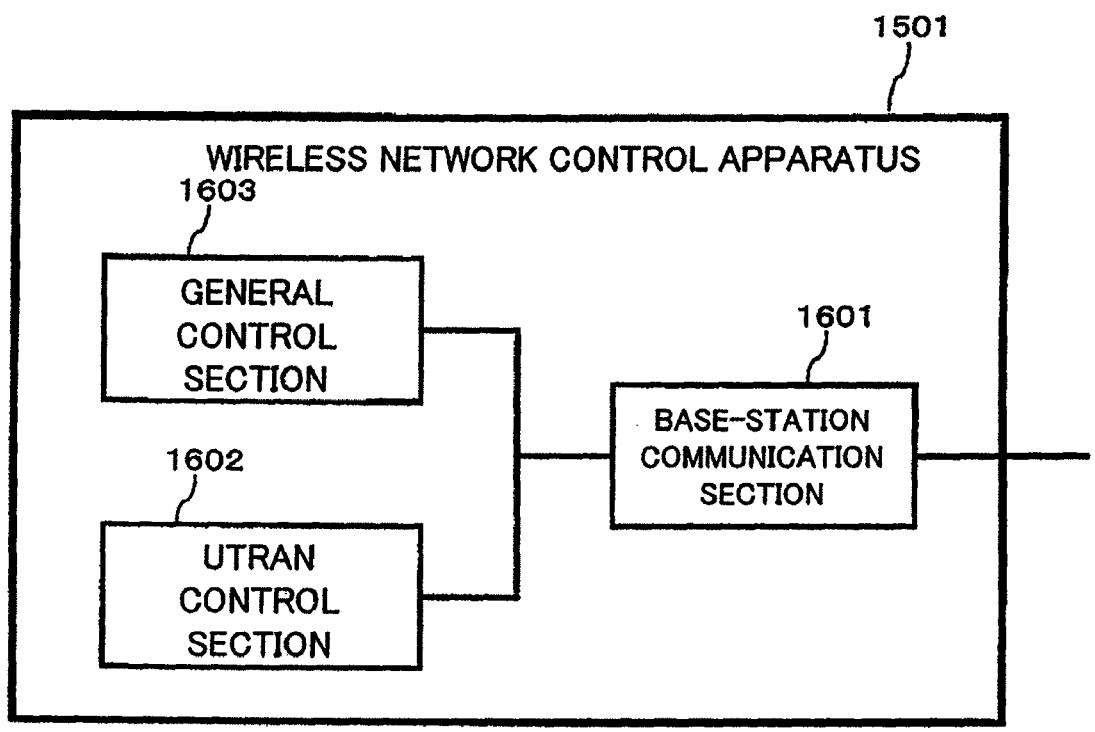
FIG. 16 is a block diagram of a wireless network control apparatus in the related art.

Hereinafter, the determination on possibility of the site diversity in the main base station is described in detail using a flowchart of FIG. 14.

First, when the main base station 802*b* receives the branch addition request (ST1401), the main base station 802*b* creates an entered-cell sharing main-base-station list 905 that stores main base station IDs of main base stations that shares an entered cell (ST1402). In the embodiment, since the second sub base station 103*b* is shared by the first main base station 802*a* and the second main base station 802*b*, the entered-cell sharing main-base-station-list 905 stores the main base station ID: 1 of the first main base station 802*a*.

Next, a terminal-accommodating-main-base-station-list 906 that stores all main base stations which currently accommodate the radio links from the terminal 104 is extracted from the channelization code of the terminal 104*b*. In the embodiment, since the terminal 104*b* was stored only in the first main base station 802*a* in a time point before moving, the terminal-accommodating-main-base-station-list 906 stores only the main-base-station ID: 1.

The main base station 802*b* extracts a list of main base stations that can perform the site diversity in main base station (ST1403). Specifically, the main base station 802*b* extracts a main base station corresponding to a main base station ID stored in both the entered-cell sharing main-base-station-list 905 created in the ST1402 and the terminal-accommodating-main-base-station-list 906 as the main base station that can perform the site diversity in main base station. The main base station 802*b* extracts the main base station ID stored in both the entered-cell sharing main-base-station-list 905 and the terminal-accommodating-main-base-station-list 906, and creates a destination candidate list 907 from them (ST1404). In the embodiment, the main base station ID: 1 stored in both the entered-cell sharing main-base-station-list 905 and the terminal-accommodating-main-base-station-list 906 is stored for the terminal 104*b*.

Next, in order to determine whether the site diversity in main base station can be performed, the main base station 802b compares the number of elements of the destination candidate list 907 to zero (ST1405). When the number of elements of the destination candidate list 907 is larger than zero, the site diversity in main base station can be performed, and processing is advanced to ST1406. In the cases other than that, the processing is advanced to ST1409, in which the inter-main-base-station site diversity is performed. In the case of the embodiment, since the number of elements of the destination candidate list 907 is one, the processing is advanced to ST1406.

The ST1406 and ST1407 are processing of narrowing the main base stations that accommodate the radio link from the destination cell to one. In the ST1406, a main base station accommodating the largest number of radio links from the terminal is extracted. In the ST1407, a main base station that accommodates the radio link of the destination cell is selected according to previously set priority. As an example of a method of selecting the priority, use of a main base station having many available hardware resources at the current moment, or use of a main base station having many kinds of carriers of signals which can be accommodated is selected.

In the case of the embodiment, since the number of elements of the destination candidate list 907 is only one, the main base station that performs the site diversity is the first main base station 802a.

In the ST1409, it is determined that the site diversity in main base station is performed in the first main base station 802a. That is the end of description of a flow process of FIG. 14.

Return to FIG. 11, when the site diversity in main base station is determined to be possible in the event 1106, the second main base station 802b transmits a site-diversity-in-main-base-station-request 1107 including the channelization code of the terminal and a cell ID in RAN as an object of the site diversity to the main base station 802 that performs the site diversity, and receives a response to the request.

In the embodiment, the second main base station 802b transmits the site-diversity-in-main-base-station-request 1107 including the channelization code of the terminal 104 and the second sub base station 103b as the object of the site diversity to the first main base station 802a, and receives a response to the request. The first main base station 802a starts communication processing with the second sub base station 103b as shown by a signal 1108, and the dedicated channel is established by a signal 1109. Moreover, the first main base station 802a starts channel combining (event 1110).

After the above processing is finished, the second main base station 802b outputs a radio link addition response 1111 to the wireless network control apparatus 801, the response indicating that a requested radio link is successfully added, and that the added radio link performs MDC with the radio link in the first main base station 802a. RADIO LINK ADDITION RESPONSE in NBAP is used for this, and furthermore, ID of the radio link from the first main base station 802a to the terminal 104b is stored in Diversity Indication IE of the RADIO LINK ADDITION RESPONSE as RL ID of Combined.

When the radio link addition response 1111 is transmitted, since MDC is performed by the newly added radio link and the existing radio link, the wireless network control apparatus 801 recognizes that the site diversity in main base station is performed in the base station 802a.

The wireless network control apparatus 801 transmits a branch addition request 1112 (RRC: ACTIVE SET UPDATE) for adding the cell (b) to the terminal 104b. When the terminal 104b receives the branch addition request 1112, it starts reception of the dedicated channel using a scrambling code of the cell (b), and outputs a branch addition response 1113 (RRC: ACTIVE SET UPDATE COMPLETE) showing success of branch addition. That is the end of the branch addition processing.

While the terminal responds to the branch addition request using the branch addition response in the embodiment, the response may be another type of response as long as it includes information indicating a fact that MDC is performed with the radio link in the existing first main base station 802a.

When the radio link addition response 1111 can not include the information indicating the fact that MDC is performed with the radio link in the existing first main-base-station 802a, the following two methods can be considered as combinations of processing methods of the second main base station 802b and the wireless network control apparatus 801. (1) The radio link addition response 1111 is outputted to the wireless network control apparatus 801, and the radio link of the first main base station 802a is handled in the same way as the radio link of the second main base station 802b on the wireless network control apparatus 801. The radio link deletion request in branch deletion and the like is performed to the second main base station 802b. Furthermore, when the original radio link is eliminated by radio link deletion, and all the sub base stations 103 in communication are under a main base station itself, MDC is performed in the main base station. (2) Radio link addition failure is outputted to the wireless network control apparatus 801. The wireless network control apparatus 801 outputs the radio link addition request again to a main base station 802 having another cell ID in RAN corresponding to the cell (b). In this case, the device outputs the radio link addition request to the first main base station 802a, and consequently site diversity in main base station is performed as usual.

As described hereinbefore, in the embodiment, the second main base station 802b manages a relation between the surrounding main base stations 802 and the sub base stations 103, and performs appropriate channel setting in response to the branch addition request of the terminal 104, thereby the site diversity can be performed in the main base station 802, and consequently network bands between the wireless network control apparatus 801 and the main base station 802 can be reduced, and processing load on the wireless network control apparatus 801 can be also reduced.

The sequence shown in the embodiment is merely an example, and it can be easily analogized that even if the order of the sequence is partially changed, the same advantages are obtained.

While preferred embodiments of the invention that can be currently considered have been described hereinbefore, it will be understood that various modifications can be made to the embodiments, and attached claims may cover all the modifications without departing from the scope of real spirit of the invention.

As described hereinbefore, the invention has excellent advantages that traffic between the base station and the wireless network control apparatus can be reduced, and load on the wireless network control apparatus can be reduced, which is useful for the communication technique and the handover technique in the radio access network of the mobile communication system.

The invention claimed is:

1. A wireless network control system comprising:
 a plurality of base stations that detect and communicate with a mobile terminal;

a plurality of relay stations, each of the plurality of relay stations being associated with a respective base station of the plurality of base stations and being communicatively connected to the respective base station, and each of the plurality of relay stations relaying a communication between the respective base station and the mobile terminal; and a wireless network control apparatus that controls communication between the plurality of base stations and the mobile terminal, wherein the wireless network control apparatus comprises;

a management table that stores information (i) identifying the association between each of the plurality of relay stations and the respective base station associated therewith, and (ii) identifying a relationship between a relay station of the plurality of relay stations that is communicatively connectable with a base station of the plurality of base stations that is not associated therewith;

a search section that, when more than one base station of the plurality of the base stations detect the mobile terminal through the relay station associated therewith, searches for a base station, from the base stations that detected the mobile terminal, that can be communicatively connected to all of the relay stations associated with the base stations that detected the mobile terminal, based on the information stored in the management table; and a control section that allows the communication connection to be established between the base station identified by the search and the respective relay stations associated with the base stations that detected the mobile terminal and that can be communicatively connected to the base station identified by the search, wherein the base station identified by the search comprises a combining section that performs diversity combining by combining radio signals received from the mobile terminal through the respective relay stations, and wherein, when more than one base station of the plurality of base stations detect the mobile terminal in an accommodation area, the base station identified by the search (i) establishes the communication connection to a relay station associated with another base station that detected the mobile station, and (ii) subsequently performs the diversity combining by combining the radio signals received from the mobile terminal through the relay station associated with the base station identified by the search and radio signals received from the mobile terminal through the relay station associated with the another base station.

2. The wireless network control system according to claim 1 wherein, when the mobile terminal is detected based on information indicating a radio field intensity received from the mobile terminal, the search section searches for a base station that can be communicatively connected to relay stations that have relayed the information indicating the radio field intensity.

3. The wireless network control system according to claim 1 wherein the control section of the wireless network control apparatus disconnects a communicative connection between a base station other than the base station identified by the search and the respective relay station associated therewith.

4. The wireless network control system according to claim 1 wherein:

each base station comprises a relay-station-information transmission section that transmits information, to the wireless network control apparatus, indicating relay stations to which the respective base station can be communicatively connected; and the wireless network control apparatus comprises a management-table update section that updates the management table based on the information transmitted from the relay-station-information transmission section of each base station.

5. A wireless network control system comprising:

a plurality of base stations that detect and communicate with a mobile terminal; and a plurality of relay stations, each of the plurality of relay stations being associated with a respective base station of the plurality of base stations and being communicatively connected to the respective base station, and each of the plurality of relay stations relaying a communication between the respective base station and the mobile terminal;

wherein each respective base station of the plurality of base stations comprises:

an inter-base station communication section for communicating with another base station of the plurality of base stations;

a management table that stores information (i) identifying the association between the respective base station and the relay station associated therewith, and (ii) identifying a relationship between a relay station of the plurality of relay stations that is not associated with the respective base station, but is communicatively connectable with the respective base station;

a determination section that, when the mobile terminal is detected by the respective base station, determines whether or not the another base station that is in communication with the mobile terminal to detect the mobile terminal exists, the determination being based on information obtained from the another base station by communication using the inter-base station communication section;

a search section that, when the another base station that is in communication with the mobile terminal detected by the respective base station is determined to exist, searches for a base station, from the base stations that detected the mobile terminal, that can be communicatively connected to all of the relay stations associated with the base stations that detected the mobile terminal, based on the information stored in the management table;

a control section that communicates a control signal through the inter-base station communication section such that the communication connection is established between the base station identified by the search, and the respective relay stations that can be communicatively connected to the base station identified by the search; and a combining section that performs a diversity combining by combining radio signals received from the mobile terminal through the respective relay stations, wherein, when more than one base station of the plurality of base stations detect the mobile terminal in an accommodation area, the base station identified by the search (i) establishes the communication connection to a relay station associated with another base station that detected the mobile terminal, and (ii) subsequently performs the diversity combining by combining the radio signals received from the mobile terminal through the relay station associated with the base station identified by the search and radio signals received from the mobile terminal through the relay station associated with the another base station.

6. The wireless network control system according to claim 5, wherein, when the mobile terminal is detected based on information indicating a radio field intensity received from the mobile terminal, the determination section determines whether or not another base station that received the information indicating the radio field intensity of the mobile terminal exists, and
wherein the search section searches for a base station that can be communicatively connected to a relay station that has relayed the information indicating the radio field intensity.

7. The wireless network control system according to claim 5, wherein the control section of the base station identified by the search communicates the control signal through the inter-base station communication section such that the communication connection between a base station other than the base station identified by the search and the respective relay stations is disconnected.

8. The wireless network control system according to claim 5 wherein the base station identified by the search transmits information on the communication connection with the mobile terminal within an accommodation cell to the another base station through the inter-base station communication section.

9. A wireless network control apparatus that controls a radio access network having a plurality of base stations that detect and communicate with a mobile terminal, and having a plurality of relay stations, each of the plurality of relay stations being associated with a respective base station of the plurality of base stations and being communicatively connected to the respective base station, and each of the plurality of relay stations relaying a communication between the respective base station and the mobile terminal, the wireless network control apparatus comprising:
a management table that stores information (i) identifying the association between each of the plurality of relay stations and the respective base station associated therewith, and (ii) identifying a relationship between a relay station of the plurality of relay stations that is communicatively connectable with a base station of the plurality of base stations that is not associated therewith;
a search section that, when more than one base station of the plurality of base stations detect the mobile terminal through the relay station associated therewith, searches for a base station, from the base stations that detected the mobile terminal, that can be communicatively connected to all of the relay stations associated with the base stations that detected the mobile terminal, based on the information stored in the management table; and
a control section that, in order to allow the base station identified by the search to perform diversity combining by combining radio signals received from the mobile terminal, the received radio signals being relayed by the relay stations associated with the base stations that detected the mobile terminal, respectively, (i) establishes the communication connection between the base station identified by the search and the respective relay stations, and (ii) allows the radio signals to be transmitted from the respective relay stations to the base station identified by the search.

10. A base station that can communicate with a mobile terminal through a relay station associated therewith, the base station comprising:

an inter-base station communication section for communicating with another base station;
a management table that stores information (i) identifying the association between the base station and the relay station associated therewith, and (ii) identifying a relationship between another relay station that is not associated with the base station, but is communicatively connectable with the base station;
a determination section that, when the mobile terminal is detected by the base station, determines whether or not the another base station that is in communication with the mobile terminal through a relay station associated therewith to detect the mobile terminal exists, the determination being based on information obtained from the another base station by communicating with the another base station using the inter-base station communication section;
a search section that, when the another base station that is in communication with the mobile terminal detected by the base station is determined to exist, searches for a base station that can be communicatively connected to the relay station associated with the base station that detected the mobile terminal and can be communicatively connected to the relay station associated with the another base station determined to exist by the determination section, based on the information stored in the management table;
a control section that communicates a control signal through the inter-base station communication section such that the communication connection is established between the base station identified by the search and, as the respective relay stations, the relay station associated with the base station and the relay station associated with the another base station; and
a combining section that performs a diversity combining by combining radio signals received from the mobile terminal through the respective relay stations.

11. A wireless network control method that controls a radio access network having (i) a plurality of base stations that detect and communicate with a mobile terminal, and (ii) a plurality relay stations, each of the plurality of relay stations being associated with a respective base station of the plurality of base stations and being communicatively connected to the respective base station, and each of the plurality of relay stations relaying a communication between the respective base station and the mobile terminal, the wireless network control method comprising:
a mobile-terminal detection step of detecting the mobile terminal;
a search step of, when more than one base station of the plurality of base stations detect, in the mobile-terminal detection step, the mobile terminal through the relay station associated therewith, searching, based on a management table, for a base station of the base stations that detected the mobile terminal, wherein the base station identified by the searching is a base station that can be communicatively connected to all of the relay stations associated with the base stations that detected the mobile station, and wherein the management table stores information (i) identifying the association between each of the plurality of relay stations and the respective base station associated therewith, and (ii) identifying a relationship between a relay station of the plurality of relay stations that is communicatively connectable with a base station of the plurality of base stations that is not associated therewith; and a control step of, in order to allow the base station identified by the searching to perform a diversity combining by combining radio signals received from the mobile terminal, (i) relaying the radio signal through the relay stations associated with the base stations that detected the mobile station, respectively, by establishing the communication connection between the base station identified by the searching and the respective relay stations, and (ii) allowing the radio signals to be transmitted from the respective relay stations to the base station identified by the searching.

12. A wireless network control method that controls a radio access network having (i) a plurality of base stations that detect and communicate with a mobile terminal, and (ii) a plurality of relay stations, each of the plurality of relay stations being associated with a respective base station of the plurality of base stations and being communicatively connected to the respective base station, and each of the plurality of relay stations relaying a communication between the respective base station and the mobile terminal, the wireless network control method comprising:

using a first base station of the plurality of base stations to detect the mobile terminal;

a determination step of, when the first base station detects the mobile terminal, determining whether or not another base station of the plurality of base stations that is in communication with the mobile terminal to detect the mobile terminal exists, the determination being made based on information obtained from other base stations of the plurality of base stations;

a search step of, when the another base station that is in communication with the mobile terminal detected by the first base station is determined to exist, searching, based on a management table, for a base station, from the base stations that detected the mobile terminal, that can be communicatively connected to the relay station associated with the first base station and can be communicatively connected to a relay station of the plurality of relay stations that is associated with the another base station determined to exist in the determination step, wherein the management table stores information (i) identifying the association between the first base station and the relay station associated therewith, and (ii) identifying a relationship between a relay station of the plurality of relay stations that is communicatively connectable with the first base station and that is not associated with the first base station;

a control step of communicating a control signal through an inter-base station communication section, such that the communication connection is established between the base station identified by the searching and the respective relay station associated with the first base station and the respective relay station associated with the another base station; and a combining step of performing diversity combining by combining radio signals received from the mobile terminal through a plurality of relay stations.

* * * * *